United States Patent
Okada et al.

(10) Patent No.: US 9,047,247 B2
(45) Date of Patent: Jun. 2, 2015

(54) STORAGE SYSTEM AND DATA PROCESSING METHOD

(71) Applicant: Hitachi, Ltd., Tokyo (JP)

(72) Inventors: Wataru Okada, Yokohama (JP); Masaaki Iwasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 13/696,895

(22) PCT Filed: Oct. 30, 2012

(86) PCT No.: PCT/JP2012/006965
§ 371 (c)(1),
(2) Date: Nov. 8, 2012

(87) PCT Pub. No.: WO2014/068615
PCT Pub. Date: May 8, 2014

(65) Prior Publication Data
US 2014/0122919 A1 May 1, 2014

(51) Int. Cl.
*G06F 11/20* (2006.01)
*G06F 11/16* (2006.01)
*G06F 11/14* (2006.01)

(52) U.S. Cl.
CPC ........ *G06F 11/2017* (2013.01); *G06F 11/1448* (2013.01); *G06F 11/1662* (2013.01); *G06F 11/2025* (2013.01); *G06F 11/2028* (2013.01); *G06F 11/2035* (2013.01); *G06F 11/2038* (2013.01); *G06F 11/2048* (2013.01)

(58) Field of Classification Search
CPC ............ G06F 11/2017; G06F 11/2005; G06F 11/0793; G06F 11/0751; G06F 11/1446; G06F 11/1438; G06F 11/2028; G06F 11/203; G06F 11/1458; G06F 11/1471; G06F 11/1484
See application file for complete search history.

(56) References Cited

U.S. PATENT DOCUMENTS

| 7,412,576 | B2 * | 8/2008 | Yagawa ........................ 711/161 |
| 7,467,329 | B1 * | 12/2008 | Keeton et al. .................... 714/15 |
| 7,543,174 | B1 | 6/2009 | Van Rietschote et al. |
| 7,895,162 | B2 * | 2/2011 | Tanaka et al. ................. 707/640 |

(Continued)

FOREIGN PATENT DOCUMENTS

| JP | 2008-299481 A | 12/2008 |
| JP | 2011-248668 A | 12/2011 |
| JP | 2012-027656 A | 2/2012 |

OTHER PUBLICATIONS

PCT International Search Report and Written Opinion on application PCT/JP2012/006965 mailed Oct. 9, 2013; 11 pages.

*Primary Examiner* — Nadeem Iqbal
(74) *Attorney, Agent, or Firm* — Foley & Lardner LLP

(57) ABSTRACT

The present invention comprises a management computer which exchanges information with storage apparatuses and host computers of primary sites and a secondary site via a management network and which manages a data processing performance and a data processing status of each of the sites, wherein, when any of the primary sites is subject to disaster, the management computer selects a normal primary site for which a data transfer time of a restoration target application is within a recovery time objective as a restoration site which possesses processing performance for restoring the application, and remote-copies restoration copy data, which exists at the secondary site, to the storage apparatus of the primary site selected as the restoration site, via a data network.

12 Claims, 19 Drawing Sheets

(56) References Cited

U.S. PATENT DOCUMENTS

| | | |
|---|---|---|
| 8,260,754 B2 * | 9/2012 | Tatebe et al. .................. 707/675 |
| 2004/0205382 A1 | 10/2004 | Noda et al. |
| 2008/0140966 A1 * | 6/2008 | Deguchi et al. ............... 711/162 |
| 2008/0301492 A1 | 12/2008 | Honda et al. |
| 2009/0138753 A1 | 5/2009 | Tameshige et al. |
| 2009/0164531 A1 * | 6/2009 | Tanaka et al. ................. 707/204 |
| 2009/0172461 A1 * | 7/2009 | Bobak et al. ...................... 714/2 |
| 2011/0295809 A1 | 12/2011 | Tatebe et al. |
| 2013/0007504 A1 * | 1/2013 | Bodke et al. ................... 714/4.2 |

* cited by examiner

| VOLUME ID | DATA CENTER ID | STORAGE ID | LDEV ID | CAPACITY | ASSIGNMENT STATUS |
|---|---|---|---|---|---|
| VOL01 | DC01 | ST01 | LDEV01 | 10G | COMPLETE |
| VOL02 | DC01 | ST01 | LDEV01 | 10G | COMPLETE |
| VOL03 | DC02 | ST02 | LDEV01 | 10G | INCOMPLETE |
| ... | ... | ... | ... | ... | ... |

| DATA CENTER ID | STORAGE ID | IP ADDRESS |
|---|---|---|
| DC01 | ST01 | 192.168.1.10 |
| DC02 | ST02 | 192.168.2.10 |
| DC02 | ST03 | 192.168.2.11 |
| ... | ... | ... |

| DATA CENTER ID | NORMAL CPU THRESHOLD | NORMAL MEMORY THRESHOLD | NORMAL VOLUME THRESHOLD | DISASTER STATUS |
|---|---|---|---|---|
| DC01 | 70% | 70% | 70% | NORMAL |
| DC02 | 70% | 70% | 70% | NORMAL |
| DC03 | 70% | 70% | 70% | DISASTER |
| ... | ... | ... | | |

| HOST ID | DATA CENTER ID | CORE COUNT | CORE USAGE COUNT | MEMORY CAPACITY | MEMORY USAGE CAPACITY |
|---|---|---|---|---|---|
| Host01 | DC01 | 8 | 4 | 16G | 8GB |
| Host02 | DC01 | 8 | 4 | 16G | 8GB |
| Host03 | DC02 | 8 | 4 | 16G | 8GB |
| ... | ... | ... | ... | ... | ... |

| NORMAL DATA CENTER ID (438A) | SECONDARY DATA CENTER ID (438B) | BANDWIDTH (438C) | USAGE BANDWIDTH (438D) | NORMAL BANDWIDTH THRESHOLD (438E) |
|---|---|---|---|---|
| DC 01 | DC 11 | 100MB/s | 50MB/s | 70% |
| DC 02 | DC 11 | 100MB/s | 50MB/s | 70% |
| DC 03 | DC 11 | 100MB/s | 50MB/s | 70% |
| ... | ... | ... | ... | ... |

| APPLICATION ID (440A) | NORMAL DATA CENTER ID (440B) | CURRENT OPERATION DATA CENTER ID (440C) | USAGE CORE COUNT (440D) | USAGE MEMORY CAPACITY (440E) | USAGE VOLUME ID (440F) |
|---|---|---|---|---|---|
| AP 01 | DC 01 | DC 01 | 2 | 1GB | VOL01 |
| AP 02 | DC 01 | DC 01 | 2 | 2GB | VOL11 |
| AP 03 | DC 01 | DC 01 | 2 | 1GB | VOL21 |
| ... | ... | ... | ... | ... | ... |

| DATA CENTER ID1 (452A) | DATA CENTER ID2 (452B) | DISTANCE (452C) |
|---|---|---|
| DC 01 | DC 02 | 5 |
| DC 01 | DC 03 | 4 |
| DC 01 | DC 04 | 10 |
| ... | ... | ... |

| APPLICATION ID (454A) | RTO (454B) | POST-SITE RESTORATION RECOVERY (454C) | PRIORITY LEVEL (454D) |
|---|---|---|---|
| AP01 | 10H | Yes | 10 |
| AP02 | 30Min | No | 20 |
| AP03 | 24H | No | 30 |
| ... | ... | | |

STORAGE SYSTEM AND DATA PROCESSING METHOD

TECHNICAL FIELD

The present invention relates to a storage system and a data processing method which connect a plurality of sites comprising a host computer and a storage apparatus via a network, and manages data which is used at each site using a management computer.

BACKGROUND ART

In a storage system, as the amount of data used on each site increases, the importance of the data also rises rapidly. Hence, in order to protect the data, a high level of reliability is required. Therefore, in order to protect data from a logical fault (system fault) and a physical disaster, a disaster recovery configuration is applied to the storage system.

In a storage system to which a disaster recovery configuration is applied, for example, the management computer manages, among the plurality of sites, sites other than a backup site as primary sites and a backup site as a secondary site and, during normal operation, remote-copies data which is stored in the storage apparatus of each primary site to a storage apparatus of the secondary site via a data network, manages the remote-copied data as copy data and, when any primary site is subject to disaster, restores tasks by using copy data which exists on the secondary site. Here, using virtualization technology enables restoration resources to be shared on each site and the resources of each primary site to be collected on the secondary site.

As a system which adopts this type of technology, for example, PTL1, PTL2, and PTL3 may be cited. PTL1 discloses a technology according to which, if the management server receives a restore request from outside, the management server calculates the restore time required when executing the required restore processing on the basis of information which is collected from the storage apparatus, determines, from the calculation result, a restore method with the shortest restore time, and notifies the task server of the determined restore method, and the task server executes restore processing by means of the restore method notified by the management server.

PTL2 discloses a technology according to which remote copying is performed between a plurality of sites, and if a fault occurs with the remote copy configuration, a new copy path is detected and remote copying is restarted using the detected copy path.

PTL3 discloses a technology according to which a management server stores the current resource amount of each data center, and if a resource amount required by a user system is input, it is determined whether, in response to the generation of a fault in an area to which a data center belongs, it is possible to secure, as a backup resource, a resource amount which would enable a user system to be disposed at a data center belonging to an area unaffected by the fault, and if it is determined that such a resource amount can be secured, information specifying a primary resource amount which is to be assigned to the user system, at the data center which is the usual location for the user system, is output.

CITATION LIST

Patent Literature

[PTL 1]
    Japanese Published Patent Application No. 2011-248668
[PTL 2]
    Japanese Published Patent Application No. 2008-299481
[PTL 3]
    Japanese Published Patent Application No. 2012-27656

SUMMARY OF INVENTION

Technical Problem

PTL1 discloses the fact that both volumes and files can be restored rapidly but does not disclose technology for selecting a recovery destination primary site. Further, PTL2 discloses a technology according to which, if a fault occurs in a remote copy configuration, a new path is selected by using time for copying data when another path is selected, but does not disclose using the time for copying data when a restoration destination site is selected. Further, PTL3 discloses a technology which determines the secondary volume location by considering the delay with respect to a request from the client and the effect on normal tasks but does not disclose a technology for selecting a restoration site by considering an increase in the RTO (Recovery Time Objective) due to data copying.

However, if a disaster recovery configuration is applied to the storage system, typically, it is necessary to prepare, at the secondary site, the minimum resources required to restore resources present at a primary site subject to disaster in order to enable disaster restoration at the secondary site. Hence, even if there are a multiplicity of primary sites comprising large-scale resources, based on the premise that disaster restoration is performed at the secondary site, resources must be disposed at the secondary site according to the amount of resources present in each primary site. In this case, costs increase according to the amount of resources present at each primary site in order to also build, at the secondary site, the minimum resources required for disaster restoration. That is, even when the technologies disclosed in each of PTL1 to PTL3 are used, a site for keeping the restoration resources of the secondary site to a minimum cannot be selected when the primary site is subject to disaster.

The present invention was conceived in view of the problems of the prior art above and an object of the present invention is to provide a storage system and a data processing method with which, if any primary site of a plurality of primary sites is subject to disaster, the data which has been used at the primary site subject to disaster is restored using a primary site other than the primary site subject to disaster and the restoration resources of the secondary site can be kept to a minimum.

Solution to Problem

In order to achieve the foregoing object, the present invention comprises a management computer which exchanges information with storage apparatuses and host computers of a plurality of primary sites and a secondary site via a management network and which manages a data processing performance and a data processing status of each of the sites, wherein, when any of the primary sites is subject to disaster, the management computer selects at least a normal primary site for which a data transfer time of a restoration target application is within a recovery time objective as a restoration site which possesses processing performance for restoring the application, and remote-copies restoration copy data, which exists at the secondary site, to the storage apparatus of the primary site selected as the restoration site, via a data network.

Advantageous Effects of Invention

According to the present invention, the data which is used at a primary site subject to disaster can be restored using a normal primary site other than the primary site subject to disaster and restoration resources of a secondary site can be kept to a minimum.

BRIEF DESCRIPTION OF DRAWINGS

FIG. 5 is a configuration diagram of a volume management table.

FIG. 6 is a configuration diagram of a storage management table.

FIG. 7 is a configuration diagram of a DC management table.

FIG. 8 is a configuration diagram of a host management table.

FIG. 9 is a configuration diagram of an inter-DC connection management table.

FIG. 10 is a configuration diagram of an AP management table.

FIG. 19 is a configuration diagram of an inter-DC distance management table.

FIG. 20 is a configuration diagram of a disaster operating policy management table.

DESCRIPTION OF EMBODIMENTS

First Example

This Example is aimed at preparing resources (resources such as cores and memory) with excess performance in order to be able to cope with a sudden increase in the task load among a plurality of primary sites and, if any of the plurality of primary sites is subject to disaster, a normal primary site with a data transfer time which is in the RTO range is selected as a restoration site and copy data, which had been used at the primary site subject to disaster and which is remote-copied to the secondary site, is remote-copied from the secondary site to the normal primary site to restore a task at the normal primary site.

Figure 1:
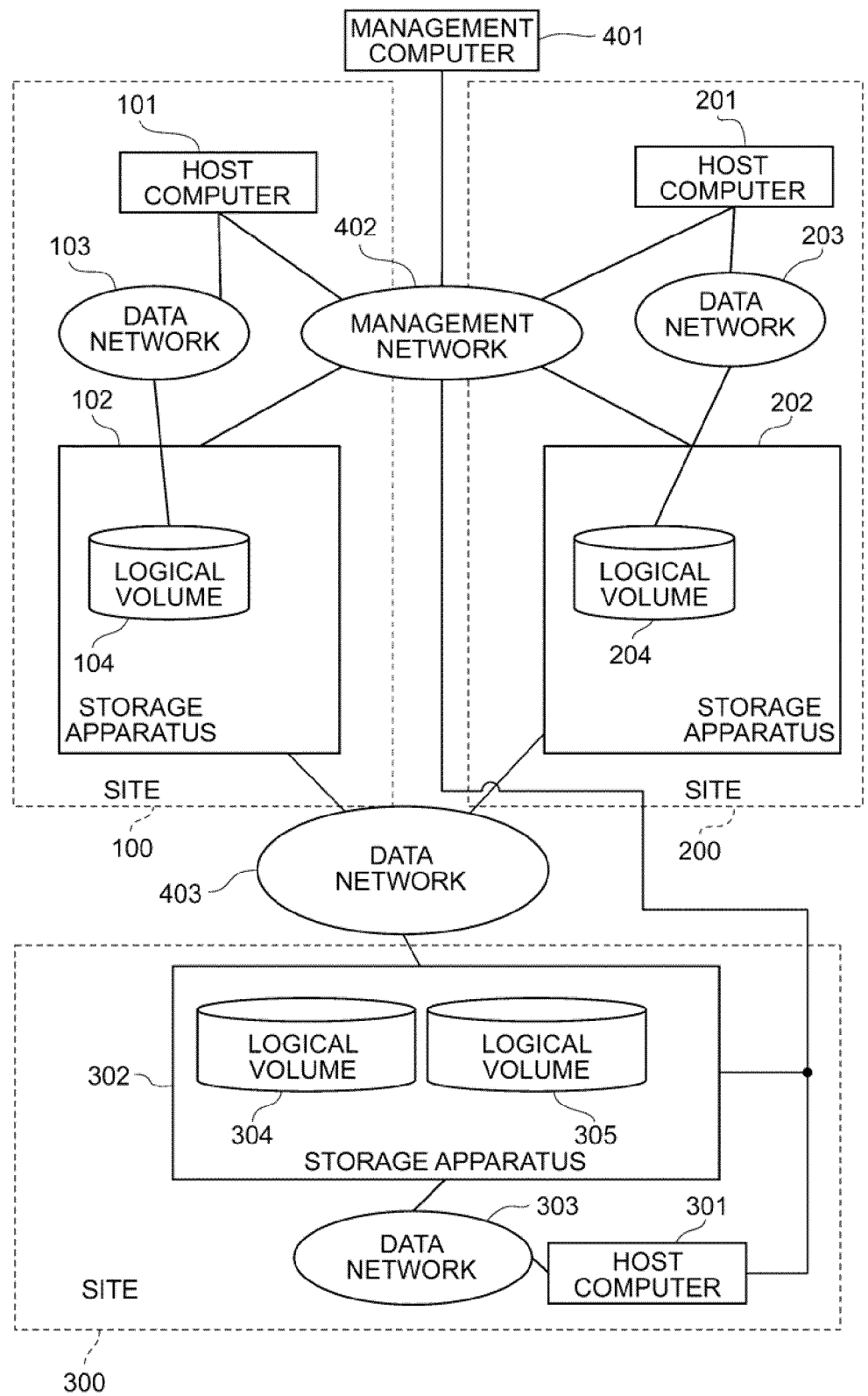
FIG. 1 is a configuration diagram of a storage system according to a First Example.

FIG. 1 is a configuration diagram of a storage system which shows a First Example of the present invention. In FIG. 1, a plurality of sites 100, 200, 300 which comprise the data center are disposed in distributed fashion. A host computer 101, a storage apparatus 102, and a data network 103 are arranged at the site 100, a host computer 201, a storage apparatus 202, and a data network 203 are arranged at the site 200, and a host computer 301, a storage apparatus 302, and a data network 303 are arranged at the site 300.

The host computer 101 is connected to the storage apparatus 102 via the data network 103, and the host computer 101 and the storage apparatus 102 are connected to a management network 402. The host computer 201 is connected to the storage apparatus 202 via the data network 203, and the host computer 201 and the storage apparatus 202 are connected to the management network 402. The host computer 301 is connected to the storage apparatus 302 via the data network 303 and the host computer 301 and the storage apparatus 302 are connected to the management network 402. The management network 402 are connected to the management computer 401 in order to manage the whole storage system. The storage apparatuses 102, 202, and 302 are each connected via a data network 403. A plurality of user terminals (none are shown) are connected to each of the host computers 101, 201, and 301 via a network comprising a router or the like. A personal computer, for example, is used for each user terminal.

The host computers 101, 201, and 301 issue a command requesting data I/O processing to the storage apparatuses 102, 202, and 302. The storage apparatuses 102, 202, and 302 each comprise a plurality of storage devices (not shown) and one or more logical volumes are built in each of the storage devices. For example, the logical volume 104 is built in a storage device of the storage apparatus 102, the logical volume 204 is built in a storage device of the storage apparatus 202, and the logical volumes 304 and 305 are built in a storage device of the storage apparatus 302. Here, the logical volume 104 is provided as an access-target logical volume to the host computer 101 and the logical volume 204 is provided as an access-target volume to the host computer 201. Further, the logical volumes 304, 305 are provided as an access target volume to the host computer 301.

When a disaster discovery (DR) configuration is applied to a storage system, during normal operation, the management computer 401 manages the sites 100 and 200 as primary sites which are different from the backup site and manages the site 300 as a backup secondary site. Further, during normal operation, the management computer 401 manages the logical volume 104 as a copy-source primary volume and manages the logical volume 304 as a copy-destination secondary volume, and remote-copies data which is stored in the logical volume 104 (task data, for example) to the logical volume 304 via the data network 403 and manages the remote-copied data as complex data. In addition, during normal operation, the management computer 401 manages the logical volume 204 as a copy-source primary volume and manages the logical volume 305 as a copy-destination secondary volume, remote-copies data stored in the logical volume 204 (task data, for example) to the logical volume 305 via the data network 403 and manages the remote-copied data as complex data.

Meanwhile, if either one of the sites 100 and 200 is subject to disaster, for example if the site 100 which is a primary site is subject to disaster, restoration complex data which exists on the site 300 which is a secondary site and which is complex data obtained from data (task data) used on the site 100 subject to disaster is remote-copied to the storage apparatus 202 of the site 200, for example, among the other normal primary sites via the data network 403 within the range permitted by an increase in the RTO, and performs data restoration processing on the site 200. Note that, in this Example, it is assumed that a plurality of sites exist as primary sites other than the sites 100 and 200.

Figure 2:
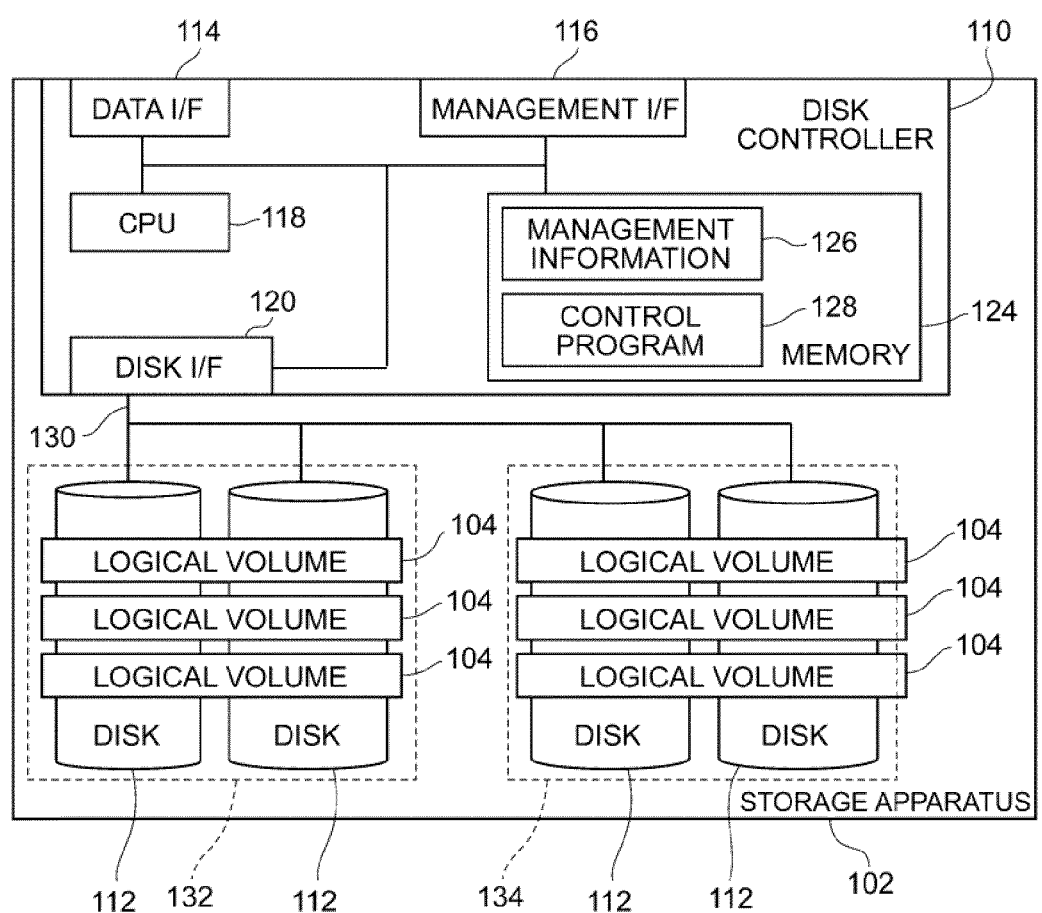
FIG. 2 is a configuration diagram of a storage apparatus.

FIG. 2 is a configuration diagram of the storage apparatus. In FIG. 2, the storage apparatus 102 is configured from the disk controller 110 and a plurality of storage devices 112. Note that the storage apparatuses 202 and 302 have the same configuration as the storage apparatus 102 and hence the configuration of the storage apparatus 102 will be described hereinbelow.

The disk controller 110 is configured from a data interface 114, a management interface 116, a CPU (Central Processing Unit) 118, a disk interface 120, and a memory 124.

The data interface 114 is connected to the data network 103 or the data network 403 and is configured as an interface which exchanges data with the host computer 101 or with the other storage apparatuses 202, 302.

The management interface 116 is connected to the management computer 401 via the management network 402 and is configured as an interface which exchanges information with the management computer 401.

The CPU 118 is a processor which performs integrated control of the whole storage apparatus 102 and which executes data I/O processing to and from each storage device 112 on the basis of the management information 126 and control program 128 which are stored in the memory 120.

The disk interface 120 is configured as an interface which exchanges data with each storage device 112 via an internal bus 130.

The memory 124 stores management information 128 for managing remote copy configuration information and RAID (Redundant Array of Inexpensive Disks) group configuration information, and stores a control program 128 for controlling data I/O processing and remote copying.

Each storage device 112 is configured from a HDD (Hard Disk Drive), for example. Examples of storage devices 112 include semiconductor memory devices, optical disk devices, magneto-optical disk devices, magnetic tape devices, and flexible disk devices and so on. Further, if a hard disk device is used as a storage device 112, SCSI (Small Computer System Interface) disks, SATA (Serial AT) disks, ATA (AT Attachment) disks, or SAS (Serial Attached SCSI) disks and the like can be used, for example.

Further, RAID groups, for example a RAID 4, a RAID 5, and a RAID 6, or the like, are configured from each of the storage devices 112 and the storage devices can each be distributed between a plurality of RAID groups 132, 134. Here, a plurality of logic units (hereinafter sometimes called LU (Logical Unit)) and a plurality of logical volumes 104 can also be formed on physical storage areas of each of the storage devices 112.

Figure 3:
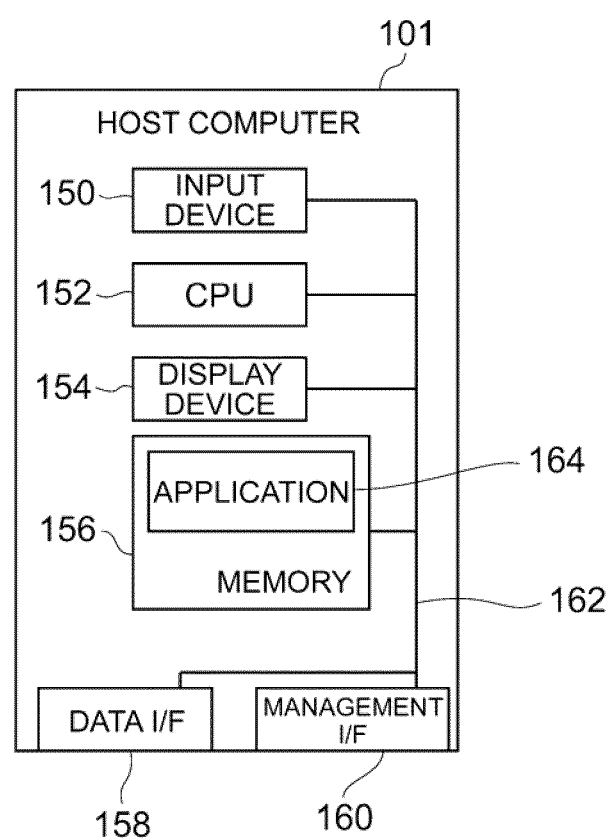
FIG. 3 is a configuration diagram of a host computer.

FIG. 3 is a configuration diagram of a host computer. In FIG. 3, the host computer 101 is configured from an input device 150, a CPU 152, a display device 154, a memory 156, a data interface 158, and a management interface 160, and each part is connected via a bus 162. Note that the host computers 201 and 301 have the same configuration as the host computer 101 and therefore the configuration of the host computer 101 will be described hereinbelow.

The input device 150 is configured from a mouse and a keyboard and the like. The CPU 152 is a processor which performs integrated control of the whole of the host computer 101 and issues a command to request data I/O processing to the storage apparatus 102.

The display device 154 is configured from a liquid-crystal display device or the like which displays data or the like which is input from the input device 50.

The memory 156 stores a program for processing by the CPU 152 and stores a plurality of data I/O processing applications (or virtual machines) 164 which are applications to be executed by the CPU 152.

The data interface 158 is connected to a data network 103 and is configured as an interface which exchanges data with the storage apparatus 102 via the data network 103. The management interface 160 is connected to the management computer 401 via the network 402 and is configured as an interface which exchanges information with the management computer 401.

Figure 4:
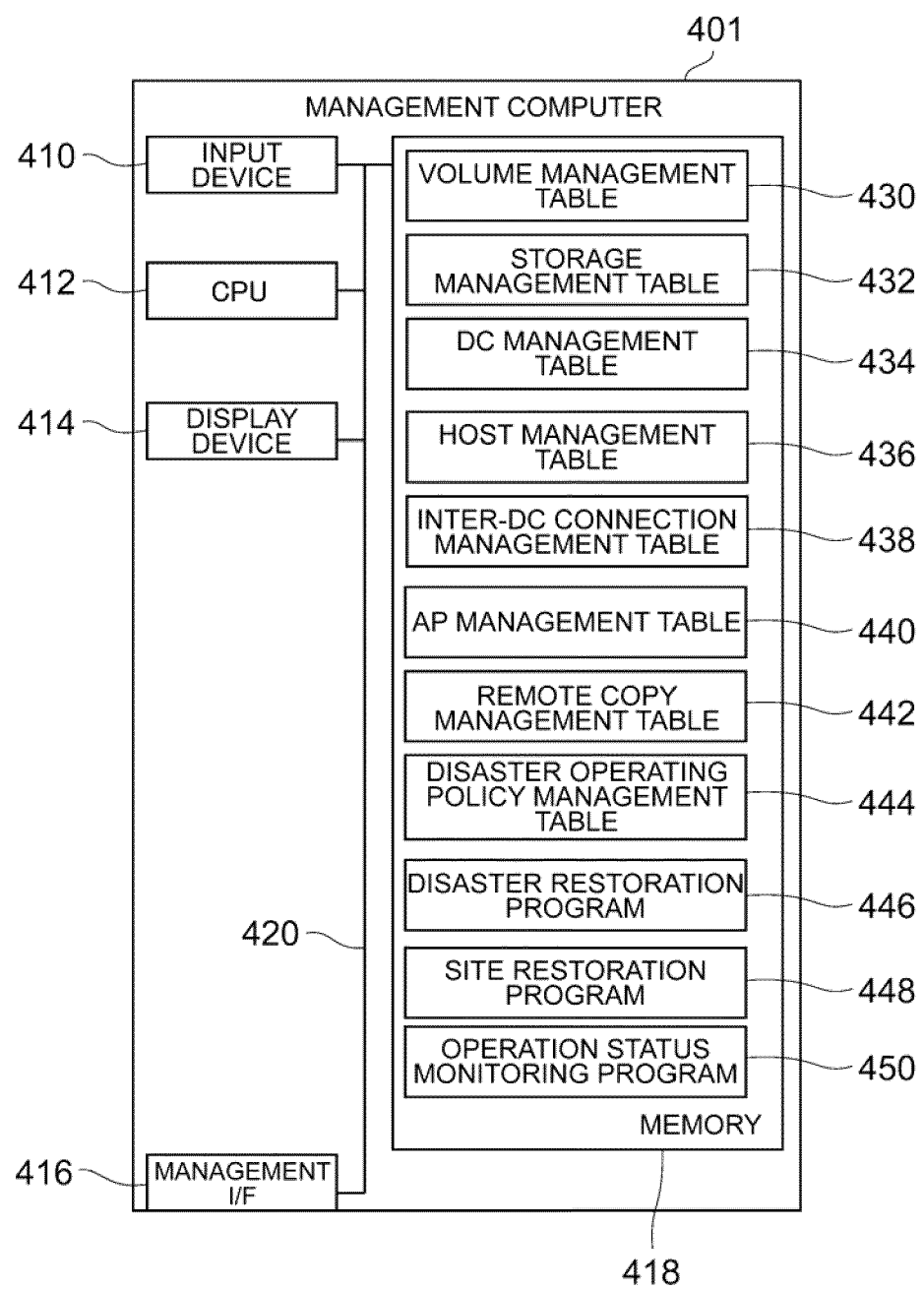
FIG. 4 is a configuration diagram of a management computer.

FIG. 4 is a configuration diagram of the management computer. In FIG. 4, the management computer 401 is configured from an I/O device 410, a CPU 412, a display device 414, a management interface 416, and a memory 418, and each part is connected via an internal bus 420.

The I/O device 410 is configured from a keyboard and a mouse or the like. The CPU 412 is a processor which performs integrated control of the whole of the management computer 401, exchanges information with the host computers 101, 202, and 302, and with the storage apparatuses 102, 202, and 302 via the management network 402, for example manages the data processing performance and the data processing status of each of the sites 100, 200, and 300, manages the existence of a disaster at each of the sites 100, 200, and 300, and manages remote-copying between each of the sites.

The display device 414 is configured from a liquid-crystal display device which displays data and information and the like which are input from the input device 410, and the like. The management interface 416 is connected to the management network 402, and is configured as an interface which exchanges data with the host computer 101, 201, 302, or with the storage apparatus 102, 202, 302.

The memory 418 stores a volume management table 430 for managing volumes disposed on each of the sites 100, 200, and 300, a storage management table 432 for managing the storage apparatuses 102, 202, and 302, a DC (data center) management table 434 for managing sites 100, 200, and 300, a host management table 436 for managing host computers 101, 201, and 301, an inter-DC connection management table 438 for managing the connection status between each of the sites, an AP management table 440 for managing an application 164 which is contained in each of the host computers 101, 201, and 301, a remote copy management table 442 for performing remote-copying which is carried out between each of the sites, and a disaster operating policy management table 444 for managing the disaster operating policy when the site 100 or site 200 is subject to disaster. Furthermore, the memory 418 stores a disaster restoration program 446, a site restoration program 448, and an operating status monitoring program 450 as programs which are executed by the CPU 412.

FIG. 5 is a configuration diagram of a volume management table. In FIG. 5, the volume management table 430 is a table for managing volumes which are disposed in the storage apparatuses 102, 202, and 302 of each of the sites 100, 200, and 300 and is configured from a volume ID field 430A, a data center ID field 430B, a storage ID field 430C, an LDEV ID field 430D, a capacity field 430E, and an assignment status field 430F.

The volume ID is an identifier for uniquely identifying a volume in the whole storage system. As entries in the volume ID field 430A, "VOL01", "VOL02", and "VOL03" are stored, for example.

The data center ID is an identifier for uniquely identifying a data center in the whole storage system, that is, a site. As entries in the data center ID field 430B, identifiers for identifying the sites 100, 200, and 300 are stored. For example, if the site 100 is a #01 data center, "DC01" is stored as an entry for the data center ID 430B.

The storage ID is an identifier for uniquely identifying a storage apparatus in the whole storage system. If the storage apparatus 102 is a #01 storage apparatus, "ST01" is stored as an entry of the storage ID field 430C.

The LDEV ID is an identifier for uniquely identifying a logical volume (LDEV) in each of the storage apparatuses. In a case where the #01 logical volume 104 is identified among the plurality of logical volumes 104, "LDEV01" is stored as an entry of the LDEV ID field 430B, and if a #02 logical volume 104 is identified, "LDEV 02" is stored as an entry of the LDEV ID field 430B.

The capacity is the storage capacity which is assigned to the logical volume 104, for example. If the storage capacity of the #01 logical volume 404 is "10G", "10G" is stored in the capacity field 430E.

The assignment status is information indicating whether a volume is in use or not in use. If a volume is assigned to a host computer or if a volume is assigned as a secondary volume during remote copying, "complete" is stored as an entry of the assignment status field 430F, and if a volume has not been used, the information "incomplete" is stored as an entry of the assignment status field 430F.

FIG. 6 is a configuration diagram of a storage management table. In FIG. 6, the storage management table 432 is a table for managing each of the storage apparatuses 102, 202, and 302, and is configured from a data center ID field 432A, a storage ID field 432B, and an IP address field 432C.

A data center ID is an identifier for identifying the sites 100, 200, and 300 which are data centers. A storage ID is an identifier for identifying the storage apparatuses 102, 202, and 302.

IP address is an IP address which is assigned to the management interface 116 of the storage apparatuses 102, 202, and 302. This IP address is used when the host computers 101, 201, and 301 access the storage apparatuses 102, 202, and 302, for example.

FIG. 7 is a configuration diagram of a DC management table. In FIG. 7, the DC (data center) management table 434 is a table for managing the sites 100, 200, and 300 and is configured from a data center ID field 434A, a normal CPU threshold field 434B, a normal memory threshold field 434C, a normal volume threshold field 434D, and a disaster status field 434E.

The data center ID is an identifier serving to uniquely identify the sites 100, 200, and 300 in the whole storage system.

The normal CPU threshold is a threshold for monitoring the load of the CPU which is used in each of the sites 100, 200, and 300 (the number of cores assigned to the application 164 among the plurality of cores which the CPU comprises) during normal usage.

The normal memory threshold is a threshold for monitoring the memory capacity of the memory which is used in each site during normal usage.

The normal volume threshold is a threshold for monitoring the volume capacity of the volumes used by each site during normal usage. Each of the thresholds is set by the system administrator and, if the CPU load, memory capacity, or volume capacity exceeds the threshold respectively, an alert is displayed on the display device 414 of the management computer 401.

The disaster status is information indicating whether the sites 100, 200, and 300 are subject to disaster or operating normally. If a site is operating normally, "normal" information is stored as an entry of the disaster status field 434E, and if a site is subject to disaster, "disaster" information is stored.

FIG. 8 is a configuration diagram of a host management table. In FIG. 8, the host management table 436 is a table for managing the host computers 101, 201, and 301 and is configured from a host ID field 436A, a data center ID field 436B, a core count field 436C, a core usage count field 436D, a memory capacity field 436E, and a memory usage capacity field 436F.

The host ID is an identifier for uniquely identifying a host computer in the whole storage system. If the host computer 101 is the #01 computer, "Host01" is stored as an entry of the host ID field 436A.

The data center ID is an identifier for uniquely identifying the sites 100, 200, and 300 in the whole storage system.

The core count is information indicating the number of cores in the CPU 152 which is contained in each of the host computers 101, 201, and 301. If the CPU 152 of the host computer 101 is configured from eight cores, "8" is stored as an entry of the core count field 436C.

The core usage count is information indicating the number of cores assigned to the application (AP) 164 among the cores which the CPU 152 comprises. If four cores have been assigned to the application 164, "4" is stored as an entry of the core usage count field 436D.

The memory capacity is the capacity of the memory used by the host computer 101, 201, 301, and if a 16G memory capacity is used for the memory 156 of the host computer 101, "16G" is stored as an entry of the memory capacity field 436E.

The memory usage capacity is the memory capacity which has been assigned to the application 164. For example, if an "8 GB" capacity has been assigned to the application 164 in the capacity of the memory 156, "8 GB" is stored as an entry of the memory usage capacity 436F. Note that the information recorded in the host management table 436 is managed as information which indicates the data processing performance and data processing status of the host computers 101, 201, and 301.

FIG. 9 is a configuration diagram of an inter-DC connection management table. In FIG. 9, the inter-DC connection management table 438 is a table for managing interconnected relationships between each of the sites and is configured from a primary data center ID field 438A, a secondary data center ID field 438B, a bandwidth field 438C, a usage bandwidth field 438D, and a normal bandwidth threshold field 438E.

The primary data center ID is an identifier for identifying the data center which the primary site comprises. If the site 100 is a #01 primary site, "DC01" is stored as an entry of the data center ID field 438A.

The secondary data center ID is an identifier for identifying the data center which the secondary site comprises. If the site 300 is a #11 data center which is the data center that the secondary site comprises, "DC11" is stored as an entry of the secondary data center ID field 438B.

The bandwidth indicates a remote copying data transfer bandwidth which is used for remote copying in the data network 403 linking the primary site to the secondary site. "100 MB/s", for example, is stored as an entry of the bandwidth field 438C.

The usage bandwidth is a remote copying data transfer bandwidth which is used for remote copying in the data network 403 linking the primary site to the secondary site and is the bandwidth that is actually used.

The normal bandwidth threshold is a threshold for monitoring the bandwidth which is used between the primary site and the secondary site during normal operation. This threshold is configured by the system administrator and if the usage bandwidth exceeds the bandwidth threshold, an alert is displayed on the display device 414.

FIG. 10 is a configuration diagram of an AP management table. In FIG. 10, an AP (application) management table 440 is a table for managing an application 164 which is installed on the host computers 101, 201, and 301, and is configured from an application ID field 440A, a normal data center ID field 440B, a current operation data center ID field 440C, a used core count field 440D, a usage memory capacity field 440E, and a used volume ID field 440F.

The application ID is an identifier for uniquely identifying an application 164 in the whole storage system. If a #01 application is specified among the applications 164 installed on the host computer 101, "AP01" is stored as an entry in the application ID field 440A.

The normal data center ID is an identifier for identifying the site (data center) where the application 164 is running during normal operation.

The current operation data center ID is an identifier for identifying the site (data center) where the application 164 is currently running.

The used core count is the number of cores (core count) which is assigned to the application 164 which is running. The usage memory capacity is the memory capacity which has been assigned to the running application 164.

The used volume ID is an identifier serving to identify a volume which is assigned to the application 164 which is running.

Figure 11:
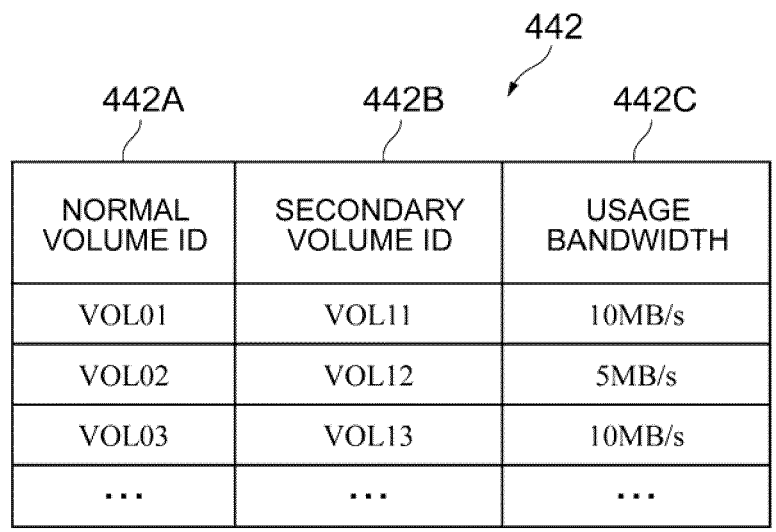
FIG. 11 is a configuration diagram of remote copy management table.

FIG. 11 is a configuration diagram of a remote copy management table. In FIG. 11, the remote copy management table 442 is a table for managing volumes which are used in remote copying and is configured from a primary volume ID field 442A, a secondary volume ID field 442B, and a used bandwidth field 442C.

The primary volume ID is an identifier for identifying a primary volume which is to serve as the copy source during remote copying.

The secondary volume ID is an identifier for identifying a secondary volume which is to serve as the copy destination during remote copying.

The usage bandwidth is information indicating the bandwidth which is actually used of the data transfer bandwidth connecting the primary volume and secondary volume during remote copying.

Figure 12:
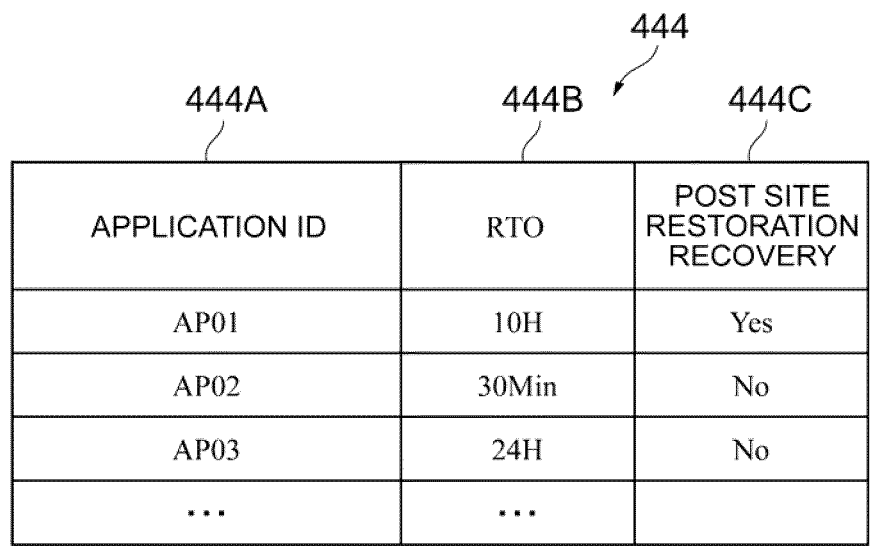
FIG. 12 is a configuration diagram of a disaster operating policy management table.

FIG. 12 is a configuration diagram of a disaster operating policy management table. In FIG. 12, the disaster operating policy management table 444 is a table for managing operation policies at the time of a disaster when primary sites are subject to disaster and is configured from an application ID field 440A, an RTO field 444B, and a post-site recovery recovery field 444C.

The application ID is an identifier for uniquely identifying an application 164 in the whole storage system.

The RTO (recovery time objective) is the time which it desirably takes until data is restored from the moment a disaster occurs when a disaster takes place and which is configured by the system administrator.

The post-site recovery recovery is information indicating, if a site subject to disaster is restored, whether an application 164 must be restored to the original site where the application 164 was running. If a site subject to disaster is restored and if the application 164 running on the site subject to disaster must be restored to the original site, "Yes" is stored as an entry in the post-site recovery recovery field 444C, and if the application 164 need not be restored to the original site, "No" is stored as an entry of the post-site recovery recovery field 444C.

Figure 13:
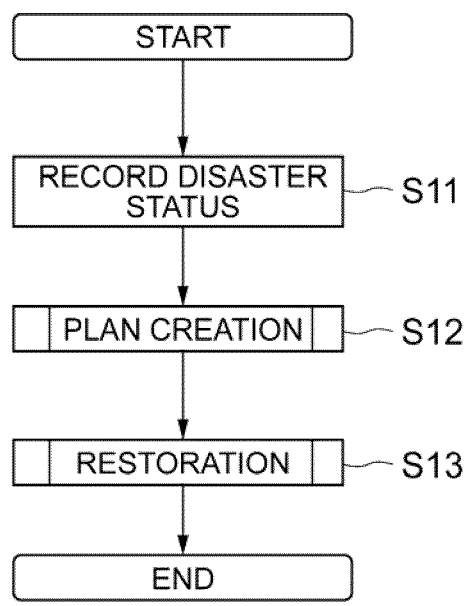
FIG. 13 is a flowchart serving to illustrate processing of a disaster restoration program.

FIG. 13 is a flowchart serving to illustrate processing of the disaster restoration program. This processing is started as a result of the CPU 412 starting the disaster restoration program 446 in response to an instruction from the system administrator when a primary site is subject to disaster. Note that the processing can also be started in response to an instruction from a disaster detection system (a detection system with a health check function or the like).

First, the CPU 412 exchanges information with the host computers 101, 201, and 301 via the management network 402 and, if the site 100 is subject to disaster, for example, the CPU 412 records the disaster status of the site 100 (S11), updates the information of the data center management table 434 on the basis of the recorded disaster status and then executes plan creation processing for creating a restoration plan on the basis of the recorded disaster status (S12), and subsequently executes processing to restore data on the basis of the created restoration plan (S13), and ends the processing of this routine.

Figure 14:
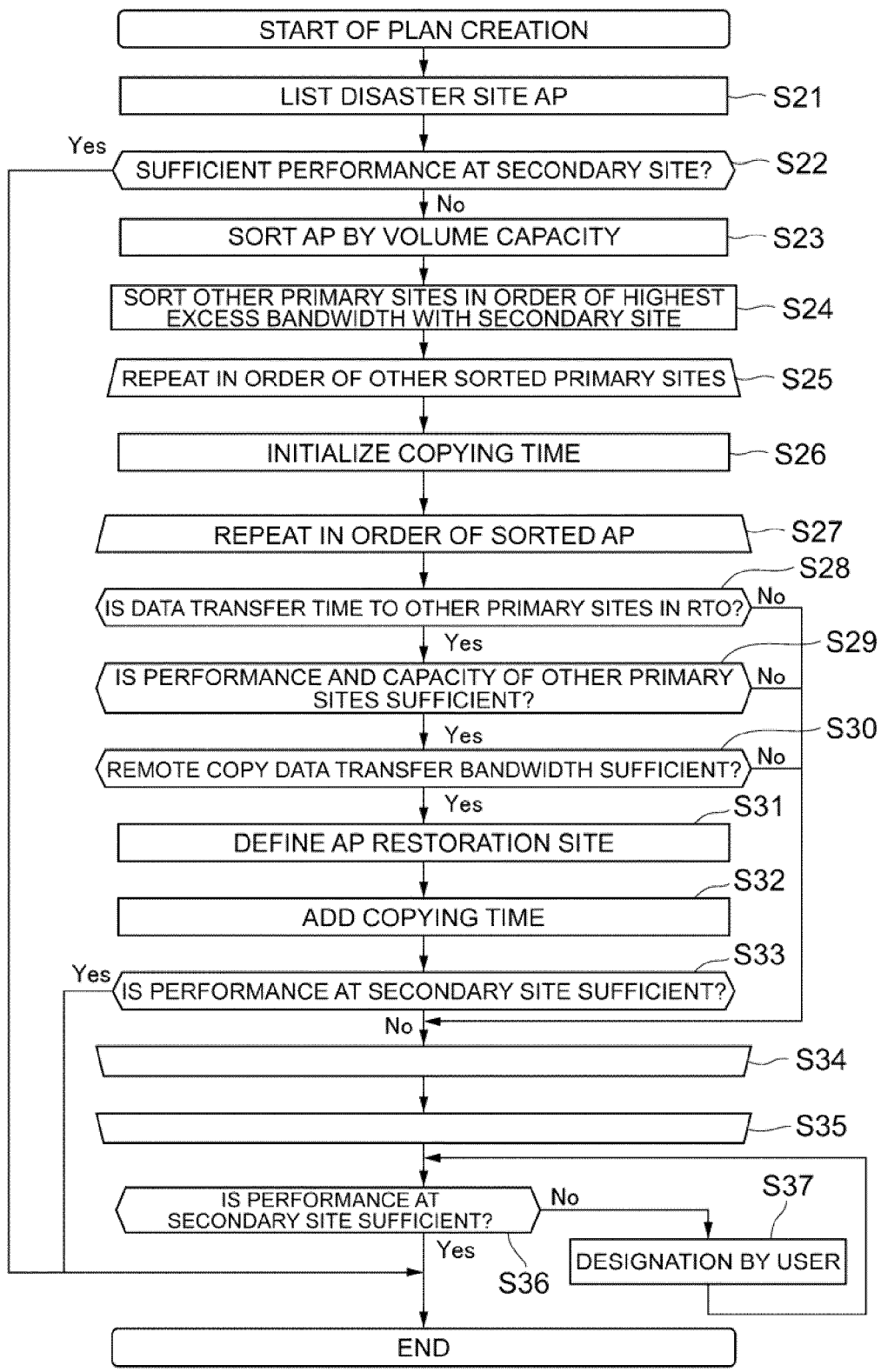
FIG. 14 is a flowchart serving to illustrate plan creation processing.

FIG. 14 is a flowchart serving to illustrate plan creation processing. This processing is executed by the CPU 412 which is specific content of step S12. The CPU 412 references the AP management table 440 and lists the applications 164 running on the site 100 subject to disaster (S21).

Upon rescuing the applications 164 of the site 100 subject to disaster, the CPU 412 then determines whether restoration processing is sufficient via the functions of the secondary site (site 300) (S22). In this case, the CPU 412 references the host management table 436 and the AP management table 440 and determines whether adequate cores exist on the site 300 as cores for executing the applications 164, for example, as an adequate performance for rescuing the applications 164 running on the site 100.

If an affirmative determination result is obtained in step S22, restoration processing is possible on the site 300, and hence the CPU 412 ends the processing of this routine, and if a negative determination result is obtained in step S22, the CPU 412 sorts the applications 164 listed in step S22 in order of the largest volume capacity (S23).

The CPU 412 then references the inter-DC connection management table 438 and sorts the other normal primary sites (primary sites other than site 100), for example site 200 and so on, in order, starting with the primary site with the largest excess bandwidth with the secondary site (S24).

The CPU 412 then repeats the following processing as far as step S35 sequentially for the other sorted primary sites (S25).

The CPU 412 initializes the copying times of the other sorted primary sites (S26). For example, the copying times of the other primary sites are set at 0.

The CPU 412 subsequently repeats the following processing as far as step S34 sequentially for the applications 164 sorted by volume capacity (S27).

The CPU 412 then determines whether the data transfer times from the secondary site (site 300) to another primary site (site 200), for example, for the applications 164 sorted by volume capacity are within the RTO (S28). Here, the CPU 412 references the AP management table 440 and the disaster operating policy management table 444, divides the capacity of the sorted restoration target applications 164 by the excess bandwidth calculated in step S24, calculates the data transfer times, and determines whether the calculated data transfer times are within the RTO.

If a negative determination result is obtained in step S28, the CPU 412 moves to the processing of step S36, and if an affirmative determination result is obtained in step S28, the CPU 412 references the host management table 436 and the AP management table 440, and determines whether the performance and capacity of the other sorted primary sites are sufficient (S29). As for the performance of the other primary sites, the CPU 412 determines whether cores which can be assigned to the restoration target application 164 exist on the other primary sites, for example, and for the capacities of the other primary sites, the CPU 412 determines whether the capacity of an unused volume which is a volume that exists on another primary site is sufficient.

Note that, in step S29, if an application for which restoration on another site has been defined exists, the corresponding performance and capacity is subtracted from the excess performance and excess capacity assigned to the other sites.

If a negative determination result is obtained in step S29, the CPU 412 moves to the processing of step S36 and if an affirmative determination result is obtained in step S29, the CPU 412 references the inter-DC connection management table 438 and the remote copy management table 442 and determines whether sufficient remote copying data transfer bandwidth exists as remote copying data transfer bandwidth which is used when remote-copying the restoration copy data which exists on the secondary site, which is data that is used by the restoration target application 164, to the primary site (S30).

If a negative determination result is obtained in step S30, the CPU 412 moves to the processing of step S36, and if an affirmative determination result is obtained in step S30, the CPU 412 defines the application restoration site (S31). For example, if the site 200 fulfills all the conditions defined in steps S28, S29, and S30, the CPU 412 defines the site 200 as the application restoration site.

The CPU 412 then adds the data transfer time calculated in step S28 to the copying time (S32).

Similarly to step S22, CPU 412 then determines whether the secondary site possesses sufficient performance to restore the restoration target application 164 (S33). That is, although the primary site to be restored has been defined for some of the applications 164 among the plurality of sorted applications 164, if the primary site to be restored has not been defined for the remaining applications 164, the CPU 412 determines whether the remaining applications 164 can be restored via the secondary site.

If a negative determination result was obtained in step S33, the CPU 412 moves to the processing of step S36, and if an affirmative determination result is obtained in step S33, the CPU 412 ends the processing of this routine.

The CPU 412 determines whether sufficient performance exists to restore the remaining applications 164, which have not been assigned to another primary site, via the secondary site (S36).

If a negative determination result is obtained in step S36, that is, if an application 164 which cannot be restored via any site exists, the CPU 412 executes processing to instruct the user to restore the remaining application 164 (S37) and returns to the processing of step S36.

If, however, an affirmative determination result is obtained in step S36, the CPU 412 ends the processing of this routine.

Figure 15:
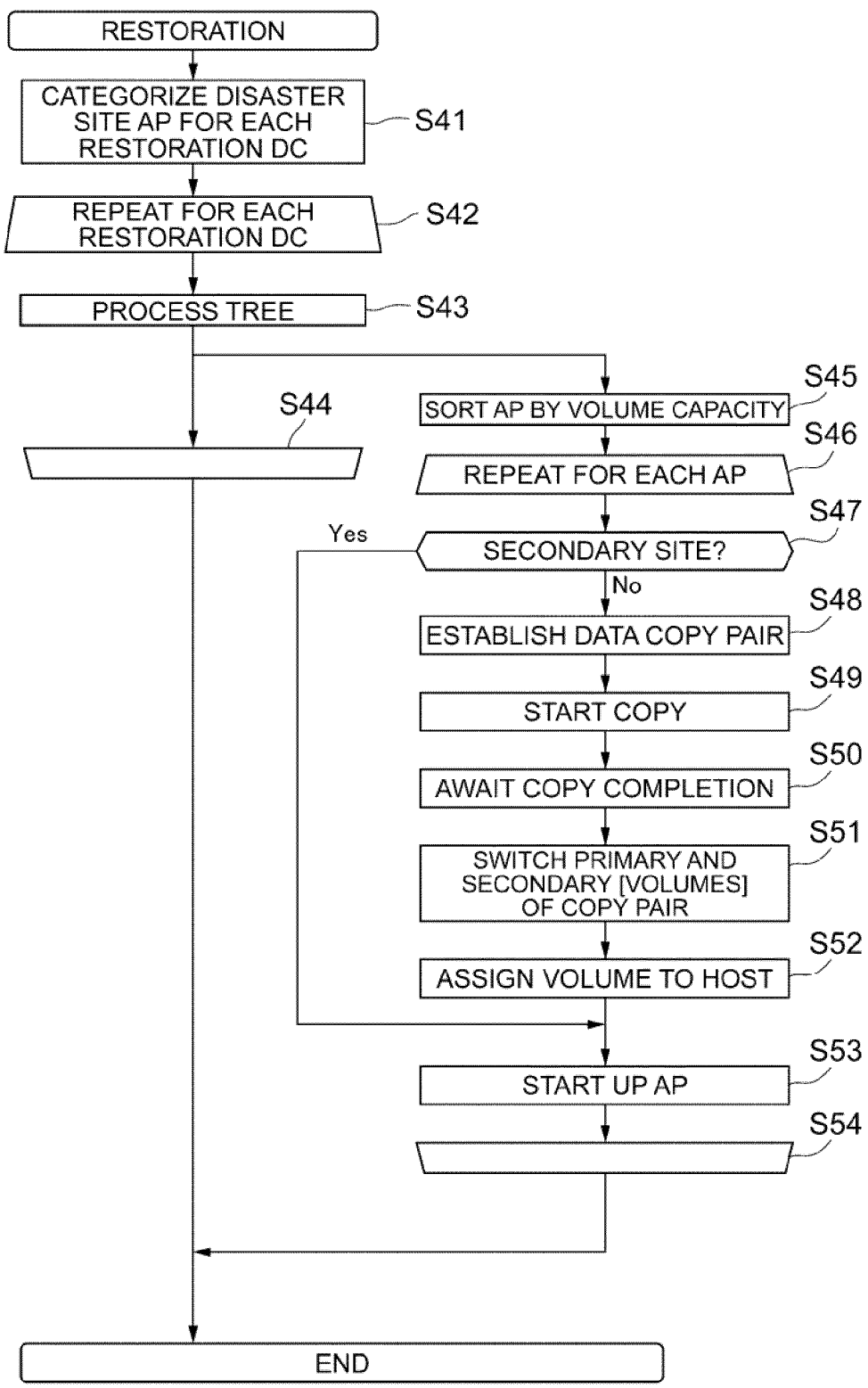
FIG. 15 is a flowchart serving to illustrate restoration processing.

FIG. 15 is a flowchart serving to illustrate restoration processing. This processing is specific content of step S13 in FIG. 13.

The CPU 412 categorizes, by restoration data center, the applications 164 of sites subject to disaster on the basis of the created plan (S41). For example, if the site subject to disaster is the site 100, the CPU 412 groups the applications 164 which were running on the site 100 by application restoration site (restoration site defined in step S31).

The CPU 412 then repeats the following processing as far as step S44 for each application restoration site (S42).

The CPU 412 then executes the process tree processing in parallel for each application restoration site (S43).

The CPU 412 subsequently sorts the restoration target applications 164 in order starting with the largest volume capacity application (S45) and repeats the following processing as far as step S54 for each of the sorted applications 164 (S46).

The CPU 412 determines whether the secondary site has been selected as the application restoration site in step S41 (S47).

If an affirmative determination result is obtained in step S47, the CPU 412 moves to the processing of step S53, and if a negative determination result is obtained in step S47, a volume copy pair is established which is used when remote copying the restoration copy data (the data which is remote copied from the site 100) which exists on the secondary site, that is, the site 300 to the site 200 (S48). For example, the CPU 412 configures a copy pair in which a logical volume 304 is taken as the primary volume and the logical volume 204 is taken as the secondary volume.

The CPU 412 then starts a copy (S49). For example, the CPU 412 remote-copies restoration copy data which is stored in the logical volume 304 which is a primary volume that exists on the site 300 to the logical volume (secondary volume) 204 via a data network 403.

The CPU 412 subsequently awaits completion of remote copying (S50), and on condition that remote copying is complete, switches the primary and secondary volumes of the copy pair of the volumes used for the copy pair (S51). For example, the CPU 412 changes the logical volume 304 from the primary volume to the secondary volume and changes the logical volume 204 from the secondary volume to the primary volume.

The CPU 412 then assigns the logical volume 204, which has been changed to the primary volume which is a logical volume that exists in the site 200, to the host computer 201 (S52).

The CPU 412 subsequently starts the application 164 which is a restoration target via a host computer 201 (S53), and on condition that the processing of step S45 to S54 is complete, the CPU 412 ends the processing of this routine.

Note that, if the restoration site for restoring the application 164 is a secondary site, because the restoration copy data which exists on the secondary site need not be copied, the processing of steps S48 to S52 is omitted.

Figure 16:
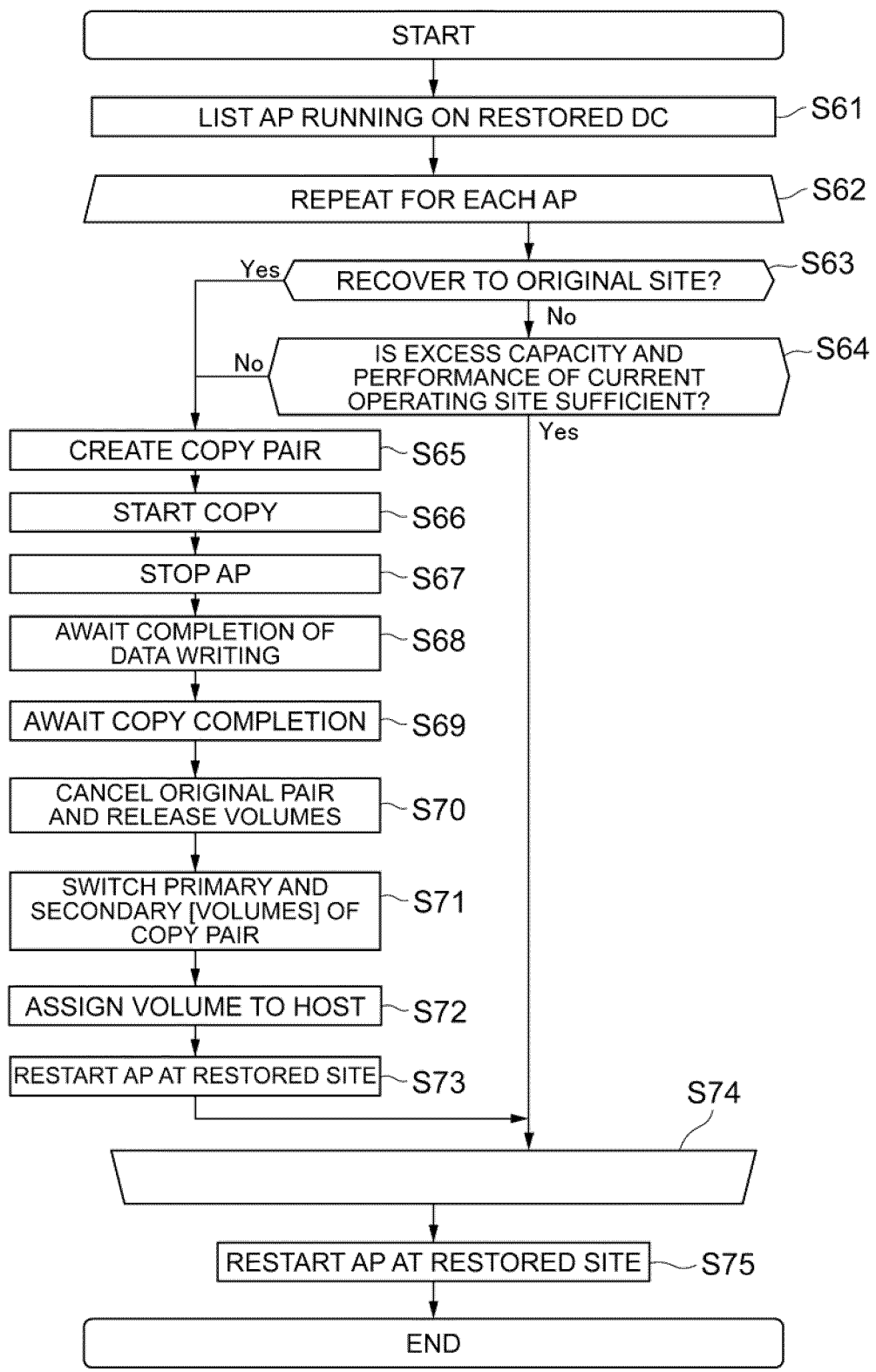
FIG. 16 is a flowchart serving to illustrate processing of a site restoration program.

FIG. 16 is a flowchart serving to illustrate site restoration processing. This processing is started as a result of the CPU 412 starting the site restoration program 448 in response to an instruction from the system administrator if the site (primary site) 100 subject to disaster is restored. Alternatively, the operating status monitoring program 450 is started if the site restoration is detected by the heartbeat signal.

The CPU 412 references the AP management table 440 and lists the applications 164 which were originally running on the restored data center (site 100) (S61).

The CPU 412 then repeats the following processing as far as step S74 for each of the listed applications 164 (S62).

The CPU 412 subsequently references the disaster operating policy management table 444 and determines whether it is necessary to restore the listed applications 164 to the original site 100 (S63), and if an affirmative determination result is obtained in step S63, moves to the processing of step S65, and if a negative determination result is obtained in step S63, determines whether the excess capacity and functions of the site (site 200, for example) which is currently operating as the site where the application 164 is being executed are sufficient (S64). In this case, the CPU 412 references the DC management table 434 and determines whether sufficient excess capacity and performance of the site where the application 164 is being executed exists on the site 200 which is currently operating.

If an affirmative determination result is obtained in step S64, the CPU 412 then moves to the processing of step S75, and if a negative determination result is obtained in step S64, the CPU 412 moves to the processing of step S65.

In step S65, the CPU 412 creates a copy pair (S65). In this case, in addition to the copy pair (original copy pair) in which the logical volume 204 is taken as the primary volume and the logical volume 304 is taken as the secondary volume, the CPU 412 creates a copy pair as an additional copy pair, in which the logical volume 304 is taken as the primary volume and the logical volume 104 is taken as the secondary volume.

The CPU 412 then starts a copy between the added copy pairs (remote copy) (S66). Thereafter, the CPU 412 stops the startup of the applications 164 run by the host computer 201 of the site 200 (S67), awaits completion of the data writing to the logical volume 304 (S68), and awaits completion of copying between the added copy pairs (remote copying) (S69), and on condition that the remote copying between the logical volume 304 and logical volume 102, which is remote copying between the site 100 and site 300, is complete, the CPU 412 releases the original copy pair and starts the logical volume 204 of the site 200 (S70).

The CPU 412 then switches the primary and secondary [volumes] of the added copy pair (S71). That is, the CPU 412 changes the logical volume 304 from the primary volume to the secondary volume and changes the logical volume 102 from the secondary volume to the primary volume.

The CPU 412 subsequently assigns the logical volume 102 to the host computer 101 (S72) and restarts the startup of the application 164 on the restored site 100 (S73). That is, the CPU 412 starts the application 164 on the host computer 101.

The CPU 412 subsequently restarts the startup of all the applications 164 on the restored site 100 (S75) and ends the processing of this routine.

Figure 17:
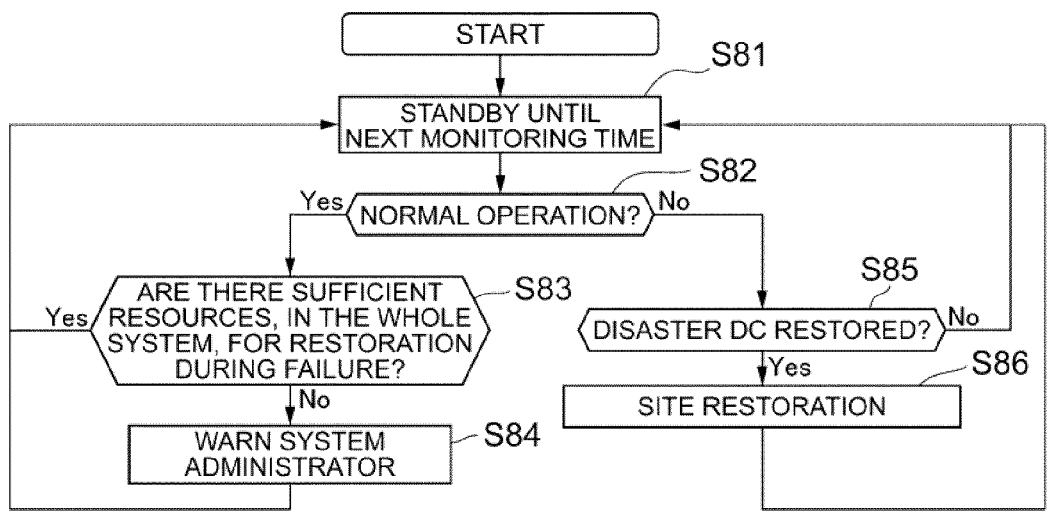
FIG. 17 is a flowchart serving to illustrate processing of an operating status monitoring program.

FIG. 17 is a flowchart serving to illustrate the processing of the operating status monitoring program. This processing is normally started as a result of the CPU 412 starting the operating status monitoring program 450 on the basis of an instruction from the system administrator.

The CPU 412 awaits monitoring timing (S81), and when the monitoring timing is reached, references the DC management table 434 and determines whether each site is operating normally (S82).

If an affirmative determination result is obtained in step S82, that is, if each site is operating normally, the CPU 412 determines whether or not sufficient resources exist, for the whole storage system, for restoration at the time of a fault (S83). In this case, the CPU 412 assumes that any of the primary sites is subject to disaster and determines whether there are sufficient resources on the basis of the plan created in the plan creation processing (the plan creation processing of FIG. 14).

If an affirmative determination result is obtained in step S83, the CPU 412 subsequently returns to the processing of step S81, and if a negative determination result is obtained in step S83, assumes that sufficient resources for restoration do not exist and executes processing to warn the system administrator (S84) and returns to step S81.

If, on the other hand, a negative determination result is obtained in step S82, that is, if either of the sites 100 and 200 is subject to disaster, the CPU 412 determines whether the data center (site) subject to disaster has been restored by means of the health check function, for example (S85). In this case, the CPU 412 references the DC management table 434, and if the data center subject to disaster has not been restored, returns to the processing of step S81, and if the data center subject to disaster has been restored, the CPU 412 executes site restoration processing (S86) and returns to the processing of step S81. In step S86, the processing of the site restoration program 448 is executed.

In this embodiment, if any of the plurality of primary sites is subject to disaster, the CPU 412 determines whether, among the normal primary sites, a primary site exists which possesses a data transfer bandwidth for which the data transfer time required to copy the restoration target application 164 from the secondary site is within the RTO, takes obtaining an affirmative result in this determination as a first condition and, determines whether, among the normal primary sites fulfilling the first condition, there exists a primary site which possesses sufficient performance to execute the restoration target application 164 and sufficient capacity for the access target volume of the restoration target application 164, takes obtaining an affirmative result in this determination as a second condition and determines whether, among the normal primary sites fulfilling the second condition, there exists a primary site which possesses sufficient data transfer bandwidth as a remote copying data transfer bandwidth for remote copying restoration copy data which exists at the secondary site, and takes obtaining an affirmative result in this determination as a third condition and selects a normal primary site which fulfills the first through third conditions as a restoration site.

Here, the CPU 412 determines whether there exists a normal primary site which fulfills first to third conditions for each application 164 if a plurality of applications 164 exists as restoration target applications 164, selects a normal primary site which fulfills the first to third conditions for each of the applications 164 as the restoration site, divides the restoration copy data which exists at the secondary site into a plurality of restoration copy data in association with each of the applications 164, and remote-copies the divided restoration copy data to the storage apparatus of the primary site selected as the restoration site for each of the applications 164 via the data network 403. Note that the CPU 412 is also able to select a normal primary site which fulfills at least the first condition as the restoration site for each of the applications 164.

According to this embodiment, if any of the plurality of primary sites is subject to disaster, a normal primary site for which at least the data transfer time is within the range of the RTO is selected as an application restoration site, the copy data, which is data which had been used at the primary site subject to disaster and has been remote-copied to the secondary site, is remote-copied from the secondary site to the normal primary site, and because a task is restored on the normal primary site, the restoration resources (resources including the cores and memory) of the secondary site can be kept to a minimum.

Second Example

This Example is devised such that, when a primary site is subject to disaster, a primary site which is a short network distance from the primary site subject to disaster is selected as the application restoration site. The configuration of the storage system according to this Example is the same as that of the First Example except for the fact that the configuration of the table disposed in the management computer 401 is partially different.

Figure 18:
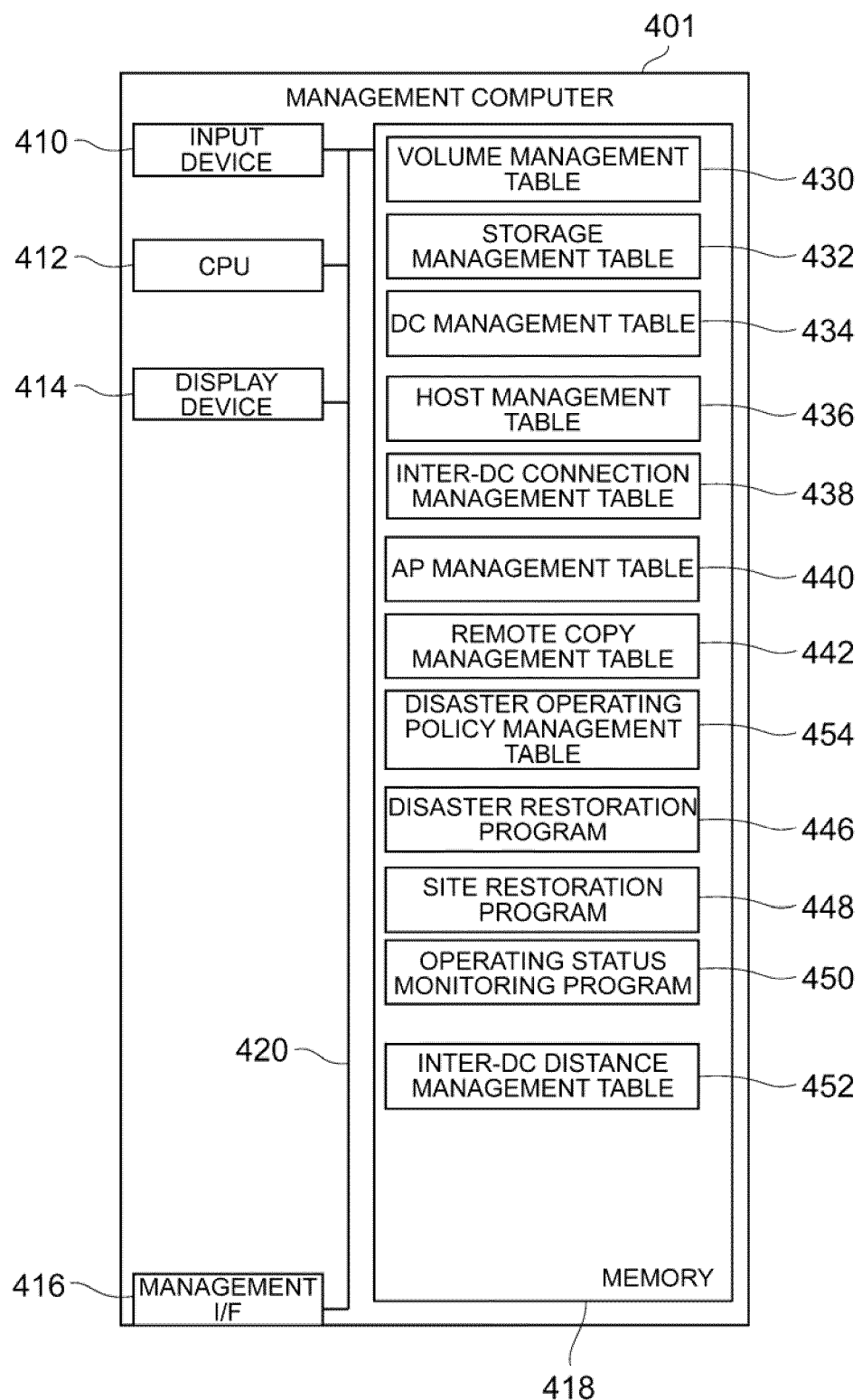
FIG. 18 is a configuration diagram of a management computer according to a Second Example.

FIG. 18 is a configuration diagram of a management computer. In FIG. 18, the inter-DC distance management table 452 is stored as a new table in the memory 418 of the management computer 401, and a disaster operating policy management table 454 is stored as a table whose content is partially different from that of the disaster operating policy management table 444.

FIG. 19 is a configuration diagram of an inter-DC distance management table. In FIG. 19, the inter-DC (data center) distance management table 452 is a table for managing a network distance between data centers (between sites) and is configured from a data center ID1 field 452A, a data center ID2 field 452B, and a distance 452C.

The data center ID1 is an identifier for identifying one data center (site) which is a measurement target when measuring the network distance between data centers.

The data center ID2 is an identifier for identifying another data center (site) which is a measurement target when measuring the network distance between data centers.

The distance is the network distance between data centers and indicates the number of hops, for example. Further, instead of the number of hops, the response time can also be used. In this case, by taking a gateway which is disposed at a data center as a calculation target, a network management tool can also be used to calculate the number of hops and response time during normal usage.

FIG. 20 is a configuration diagram of a disaster operating policy management table. In FIG. 20, the disaster operating policy management table 454 is a table for managing the operating policy when a site is subject to disaster and is configured from an application ID field 454A, an RTO field 454B, a post-site recovery recovery field 454C, and a priority level field 454D.

The application ID is an identifier for uniquely identifying an application 164 in the whole storage system.

The RTO is the time which it desirably takes until data is restored from the moment a disaster occurs when a disaster takes place and which is configured by the system administrator.

The post-site recovery recovery is information indicating, if a site subject to disaster is restored, whether there is a need to perform recovery to the original site where the application 164 was running.

The priority level is the priority level used when recovering the application 164 to the original site and a higher numerical value for the priority level indicates a higher priority level. This priority level is designated by the user.

Figure 21:
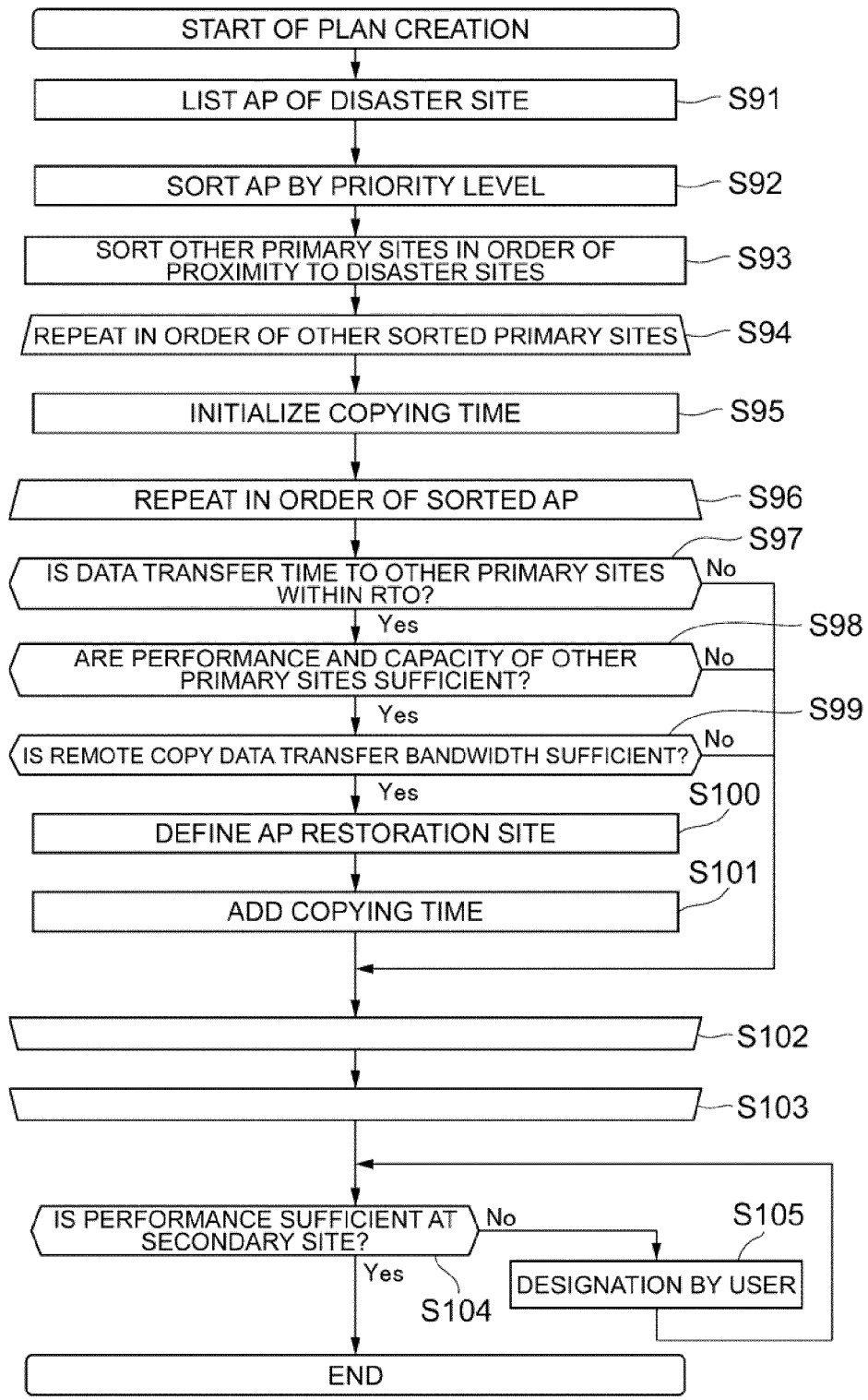
FIG. 21 is a flowchart serving to illustrate plan creation processing according to the Second Example.

FIG. 21 is a flowchart serving to illustrate plan creation processing. This processing is started by the CPU 412. First, the CPU 412 references the AP management table 440 and lists the applications 164 running on the site 100 subject to disaster (S91).

The CPU 412 then references the disaster operating policy management table 454 when rescuing the application 164 of the site 100 subject to disaster and sorts the applications 164 running on the site 100 in order of highest priority (S92).

The CPU 412 subsequently references the inter-DC distance management table 452 and sorts the other normal primary sites (the primary sites other than site 100), for example site 200 and so on, in order of proximity to the site 100 subject to disaster (S93).

The CPU 412 then repeats the following processing as far as step S103 in order of the other sorted priority sites (S94).

The CPU 412 subsequently initializes the copying time for the other sorted primary sites (S95). For example, [the CPU 412] sets the copying time of the other primary sites to 0.

Subsequently, the CPU 412 repeats the following processing as far as step S102 in the order of the applications sorted according to priority level (S96).

The CPU 412 then determines, for the applications 164 sorted in order of the highest priority level, whether the data transfer time from the secondary site (site 300) to another primary site (site 200), for example, is within the RTO (S97).

Here, the CPU 412 references the AP management table 440 and the disaster operating policy management table 446, calculates the data transfer time by dividing the capacity of the sorted restoration target applications 164 by the excess bandwidth, and determines whether the calculated data transfer time is within the RTO.

If a negative determination result is obtained in step S97, the CPU 412 moves to the processing of step S104, and if an affirmative determination result is obtained in step S97, the CPU 412 references the host management table 436 and the AP management table 440 and determines whether the performance and capacity of the other sorted primary sites are sufficient (S98). As for the performance of the other primary sites, [the CPU 412] determines whether cores which can be assigned to the restoration target application 164 exist on the other primary sites, for example, and for the capacities of the other primary sites, the CPU 412 determines whether the capacity of an unused volume which is a volume that exists on another primary site is sufficient.

If a negative determination result is obtained in step S98, the CPU 412 subsequently moves to the processing of step S104, and if an affirmative determination result is obtained in step S98, [the CPU 412] references the inter-DC connection management table 438 and the remote copy management table 442 and determines whether sufficient remote copying data transfer bandwidth exists as remote copying data transfer bandwidth which is used when remote-copying the restoration copy data which exists on the secondary site, which is data that is used by the restoration target application 164, to the primary site (S99).

If a negative determination result is obtained in step S99, the CPU 412 moves to the processing of step S104, and if an affirmative determination result is obtained in step S99, the CPU 412 defines the application restoration site (S100). For example, if the site 200 fulfills all the conditions defined in steps S97, S98, and S99, the CPU 412 defines the site 200 as the application restoration site.

The CPU 412 then adds the data transfer time calculated in step S97 to the copying time (S101).

The CPU 412 subsequently determines whether the secondary site possesses sufficient performance to restore the restoration target application 164 (S104). That is, although the primary site to be restored has been defined for some of the applications 164 among the plurality of sorted applications 164, if the primary site to be restored has not been defined for the remaining applications 164, the CPU 412 determines whether the remaining applications 164 can be restored via the secondary site.

If a negative determination result was obtained in step S104, that is, if an application 164 which cannot be restored via any site exists, the CPU 412 executes processing to instruct the user to restore the remaining application 164 (S105) and returns to the processing of step S104.

If, however, an affirmative determination result is obtained in step S104, the CPU 412 ends the processing of this routine. Note that, in this Example too, processing which is the same as the processing shown in FIGS. 15 to 17 will subsequently be executed.

According to this Example, if any of the plurality of primary sites is subject to disaster, a normal primary site which is a short network distance from the primary site subject to disaster and for which at least the data transfer time of the restoration target application 164 is in the RTO range is selected as an application restoration site, and copy data, which had been used at the primary site subject to disaster and which is remote-copied to the secondary site, is remote-copied from the secondary site to the normal primary site to restore a task at the normal primary site, and therefore restoration resources of the secondary site can be kept to a minimum.

Third Example

This Example is such that application integration is considered to restore an integrated application at the same site. The configuration of the storage system according to this Example is the same as that of the First Example except for the fact that the content of the tables and programs used by the management computer 401 is the same as that of the First Example.

Figure 22:
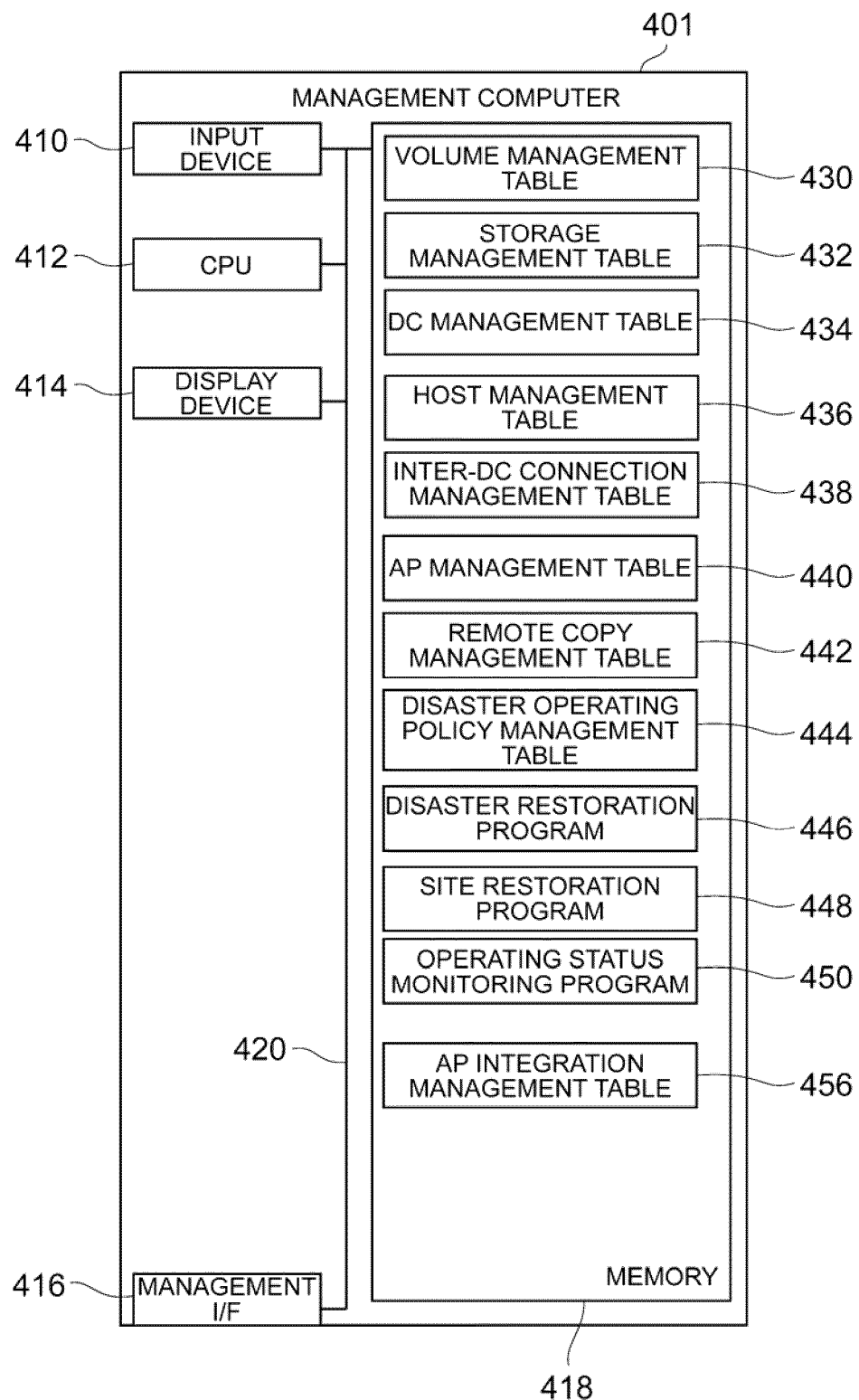
FIG. 22 is a configuration diagram of a management computer according to a Third Example.

FIG. 22 is a configuration diagram of a management computer. In FIG. 22, the AP integration management table 456 is stored as a new table in the memory 418 of the management computer 401.

Figure 23:
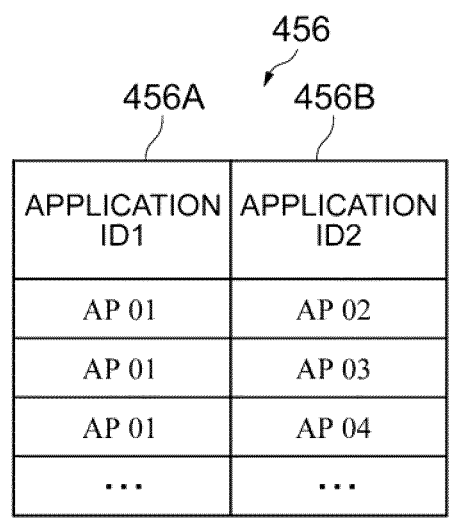
FIG. 23 is a configuration diagram of an AP integration management table.

FIG. 23 is a configuration diagram of the AP integration management table. In FIG. 23, the AP integration management table 456 is a table for managing integration between applications and is configured from an application ID1 field 456A and an application ID2 field 456B.

The application ID1 is an identifier serving to identify one application among mutually integrated applications 164. The application ID2 is an identifier serving to identify the other application 164 of the mutually integrated applications 164.

Figure 24:
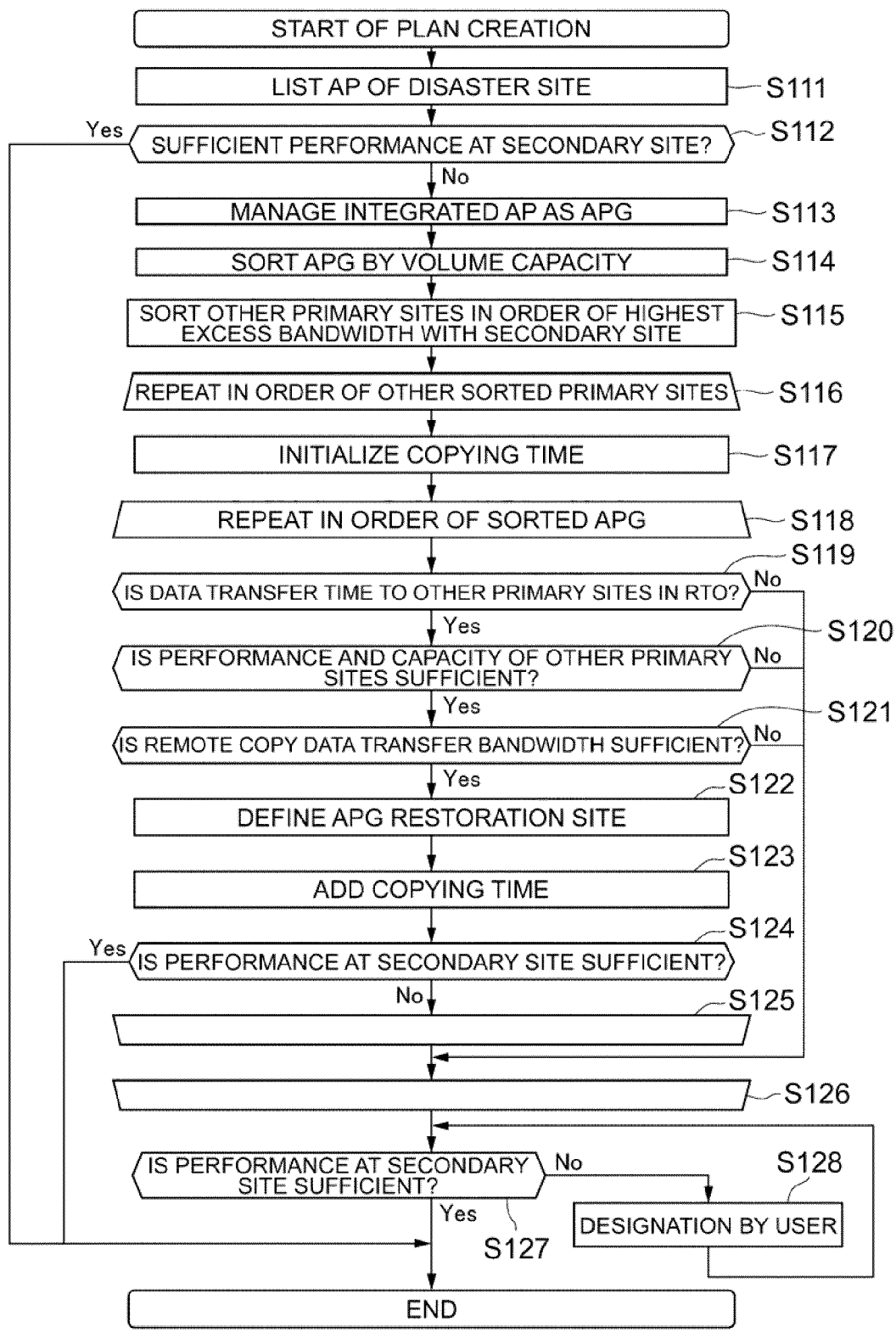
FIG. 24 is a flowchart serving to illustrate plan creation processing according to the Third Example.

FIG. 24 is a flowchart serving to illustrate plan creation processing. This processing is specific content of step S12 and is executed by the CPU 412. The CPU 412 references the AP management table 440 and lists the applications 164 running on the site 100 subject to disaster 100 (S111).

Upon rescuing the applications 164 of the site 100 subject to disaster, the CPU 412 then determines whether restoration processing is sufficient via the functions of the secondary site (site 300) (S112). In this case, the CPU 412 references the host management table 436 and the AP management table 440 and determines whether adequate cores exist on the site 300 as cores for executing the applications 164, for example, as an adequate performance for rescuing the applications 164 running on the site 100.

If an affirmative determination result is obtained in step S112, restoration processing is possible on the site 300, and hence the CPU 412 ends the processing of this routine, and if a negative determination result is obtained in step S112, the CPU 412 manages the applications 164 listed in step S111 as application groups (APG) (S113).

The CPU 412 then references the AP integration management table 456 and sorts the application groups (APG) listed in step S111 in order of largest volume capacity (S114).

The CPU 412 then references the inter-DC connection management table 438 and sorts the other normal primary sites (primary sites other than site 100), for example site 200 and so on, in order, starting with the primary site with the largest excess bandwidth with the secondary site (S115).

The CPU 412 then repeats the following processing as far as step S126 sequentially for the other sorted primary sites (S116).

The CPU 412 initializes the copying times of the other sorted primary sites (S117). For example, the copying times of the other primary sites are set at 0.

The CPU 412 then repeats the following processing as far as step S125 in order of the application groups (APG) sorted according to volume capacity (S118).

The CPU 412 then determines whether the data transfer times from the secondary site (site 300) to another primary site (site 200), for example, for the application groups sorted by volume capacity are within the RTO (S119). Here, the CPU 412 references the AP management table 440 and the disaster operating policy management table 444, divides the capacity of the sorted restoration target application groups by the excess bandwidth calculated in step S115, calculates the data transfer times, and determines whether the calculated data transfer times are within the RTO.

If a negative determination result is obtained in step S119, the CPU 412 moves to the processing of step S127, and if an affirmative determination result is obtained in step S119, the CPU 412 references the host management table 436 and the AP management table 440, and determines whether the performance and capacity of the other sorted primary sites are sufficient (S120). As for the performance of the other primary sites, the CPU 412 determines whether cores which can be assigned to the restoration target application groups exist on the other primary sites, for example, and for the capacities of the other primary sites, the CPU 412 determines whether the capacity of an unused volume which is a volume that exists on another primary site is sufficient.

If a negative determination result is obtained in step S120, the CPU 412 moves to the processing of step S127, and if an affirmative determination result is obtained in step S120, the CPU 412 references the inter-DC connection management table 438 and the remote copy management table 442 and determines whether sufficient remote copying data transfer bandwidth exists as remote copying data transfer bandwidth which is used when remote-copying the restoration copy data which exists on the secondary site, which is data that is used by the applications 164 belonging to the restoration target application group, to the primary site (S121).

If a negative determination result is obtained in step S121, the CPU 412 moves to the processing of step S127, and if an affirmative determination result is obtained in step S121, the CPU 412 defines the application group (APG) restoration site (S31). For example, if the site 200 fulfills all the conditions defined in steps S119, S120, and S121, the CPU 412 defines the site 200 as the application group (APG) restoration site.

The CPU 412 then adds the data transfer time calculated in step S119 to the copying time (S123).

Similarly to step S112, the CPU 412 then determines whether the secondary site possesses sufficient performance to restore the restoration target application (S124). That is, although the primary site to be restored has been defined for some of the application groups among the plurality of sorted application groups, if the primary site to be restored has not been defined for the remaining application groups, the CPU 412 determines whether the remaining application groups can be restored via the secondary site.

If a negative determination result was obtained in step S124, the CPU 412 moves to the processing of step S127, and if an affirmative determination result is obtained in step S124, the CPU 412 ends the processing of this routine.

The CPU 412 determines whether sufficient performance exists to restore the remaining application groups, which have not been assigned to another primary site, via the secondary site (S127).

If a negative determination result is obtained in step S127, that is, if an application group which cannot be restored via any site exists, the CPU 412 executes processing to instruct the user to restore the remaining application groups (S128) and returns to the processing of step S127.

If, however, an affirmative determination result is obtained in step S127, the CPU 412 ends the processing of this routine. Note that, in this Example, processing which is the same as the processing shown in FIGS. 15 to 17 is executed.

In this Example, if a plurality of application groups (APG) comprising a plurality of mutually integrated applications 164 exist as applications 164 which are to serve as restoration targets, the CPU 412 determines, for each of the application groups, whether, among the normal primary sites, a primary site exists which possesses a data transfer bandwidth for which the data transfer time required to copy each application group from the secondary site is within the RTO, takes at least obtaining an affirmative result in this determination as a first condition and, determines whether, among the normal primary sites fulfilling the first condition, there exists a primary site which possesses sufficient performance to execute each application group and sufficient capacity for the access target volume of each application group, takes obtaining an affirmative result in this determination as a second condition and determines, for each application group, whether, among the normal primary sites fulfilling the second condition, there exists a primary site which possesses sufficient data transfer bandwidth as remote copying data transfer bandwidth for remote copying restoration copy data which exists at the secondary site, and takes obtaining an affirmative result in this determination as a third condition and selects, for each application group, a normal primary site which fulfills the first through third conditions as a restoration site. Note that the CPU 412 is also able to select a normal primary site which fulfills at least the first condition as the restoration site for each of the application groups.

Further, in this Example, after selecting a normal primary site as the restoration site for each application group, the CPU 412 divides the restoration copy data which exists at the secondary site into a plurality of restoration copy data in association with each of the application groups, and remote-copies the divided restoration copy data to the storage apparatus of the primary site selected as the restoration site for each of the application groups via the data network 403.

According to this embodiment, if any of the plurality of primary sites is subject to disaster, a normal primary site for which at least the data transfer time of the application group which comprises mutually integrated applications 164 is within the range of the RTO is selected as an application group restoration site, and the copy data, which is data which had been used at the primary site subject to disaster and has been remote-copied to the secondary site, is remote-copied from the secondary site to the normal primary site, and because a task is restored on the normal primary site, the restoration resources of the secondary site can be kept to a minimum.

Note that the present invention is not limited to the foregoing Examples and encompasses various modifications. For example, part of the configuration of a certain Example can be replaced with the configuration of another Example and the configuration of another Example can also be added to the configuration of a certain Example.

Furthermore, each of the foregoing configurations and functions and so on may also be implemented by hardware such as by designing all or part of the configurations and functions as an integrated circuit, for example. Further, each of the foregoing configurations and functions and so on may also be realized by software as a result of a processor parsing and executing programs which implement the respective functions. Information such as programs, tables, and files which implement each of the functions can also be recorded and installed on a recording device such as a memory, hard disk, or SSD (Solid State Drive), or a recording medium such as an IC (Integrated Circuit) card, an SD (Secure Digital) memory card, or a DVD (Digital Versatile Disc).

REFERENCE SIGNS LIST 100, 200, 300 Site
101, 201, 301 Host computer
102, 202, 302 Storage apparatus
103, 203, 303, 403 Data network
401 Management computer
402 Management network
412 CPU
430 Volume management table
432 Storage management table
434 DC management table
436 Host management table
438 Inter-DC connection management table
440 AP management table
442 Remote copy management table
444 Disaster operating policy management table
446 Disaster restoration program
448 Site restoration program
450 Operating status monitoring program
452 Inter-DC distance management table
454 Disaster operating policy management table
AP integration management table

The invention claimed is:
1. A storage system, comprising:
a plurality of sites which comprise a storage apparatus comprising a plurality of storage devices, and a host computer which is configured to issue data I/O processing requests to the storage apparatus;
a data network which interconnects the storage apparatuses of each of the sites; and
a management computer which is configured to exchange information with the storage apparatuses and host computers of each of the sites via a management network and which is configured to manage a data processing performance and a data processing status of each of the sites,
wherein the management computer is configured to manage, among the plurality of sites, two or more sites other than a backup site as primary sites and the backup site as a secondary site respectively, remote-copy data which is stored in the storage apparatuses of each of the primary sites to the storage apparatus of the secondary site via the data network respectively, and manage the remote-copied data as copy data, and
wherein, when any of the primary sites is subject to disaster, the management computer is configured to select, on the basis of the data processing performance and the data processing status of the sites other than the primary site subject to disaster, at least a normal primary site other than the primary site subject to disaster as a restoration site which possesses processing performance for restoring a restoration target application which is a data I/O processing application which was running on the primary site subject to disaster, and remote-copy restoration copy data, which exists at the secondary site and which is data that was used by the restoration target application, to the storage apparatus of the primary site selected as the restoration site, via the data network, and wherein the management computer is configured to determine whether, among the normal primary sites, there exists a primary site with a data transfer bandwidth for which a data transfer time required to copy the restoration target application from the secondary site is within a recovery time objective, take at least obtaining an affirmative result in this determination as a first condition, and select a normal primary site which fulfills the first condition as the restoration site, and wherein the management computer is configured to determine whether, among the normal primary sites which fulfill the first condition, there exists a primary site which possesses sufficient performance to execute the restoration target application and sufficient capacity for the access target volume of the restoration target application, take at least obtaining an affirmative result in this determination as a second condition, and select a normal primary site which fulfills the second condition as the restoration site.

2. The storage system according to claim 1,
wherein the management computer is configured to determine whether, among the normal primary sites which fulfill the second condition, there exists a primary site which possesses sufficient data transfer bandwidth as remote copying data transfer bandwidth for remote-copying restoration copy data which exists at the secondary site, take at least obtaining an affirmative result in this determination as a third condition, and select a normal primary site which fulfills the third condition as the restoration site.

3. A storage system, comprising:
a plurality of sites which comprise a storage apparatus comprising a plurality of storage devices, and a host computer which is configured to issue data I/O processing requests to the storage apparatus;

a data network which interconnects the storage apparatuses of each of the sites; and a management computer which is configured to exchange information with the storage apparatuses and host computers of each of the sites via a management network and which is configured to manage a data processing performance and a data processing status of each of the sites, wherein the management computer is configured to manage, among the plurality of sites, two or more sites other than a backup site as primary sites and the backup site as a secondary site respectively, remote-copy data which is stored in the storage apparatuses of each of the primary sites to the storage apparatus of the secondary site via the data network respectively, and manage the remote-copied data as copy data, and wherein, when any of the primary sites is subject to disaster, the management computer is configured to select, on the basis of the data processing performance and the data processing status of the sites other than the primary site subject to disaster, at least a normal primary site other than the primary site subject to disaster as a restoration site which possesses processing performance for restoring a restoration target application which is a data I/O processing application which was running on the primary site subject to disaster, and remote-copy restoration copy data, which exists at the secondary site and which is data that was used by the restoration target application, to the storage apparatus of the primary site selected as the restoration site, via the data network, wherein, if a plurality of restoration target applications exist as the restoration target application, the management computer is configured to determine, for each of the restoration target applications, whether, among the normal primary sites, there exists a primary site which possesses a data transfer bandwidth for which the data transfer time required to copy each of the restoration target applications from the secondary site is within a recovery time objective, take at least obtaining an affirmative result in this determination as a first condition, and select, for each of the restoration target applications, a normal primary site which fulfills the first condition as the restoration site.

4. The storage system according to claim 3,
wherein the management computer is configured to determine, for each of the restoration target applications, whether, among the normal primary sites which fulfill the first condition, there exists a primary site which possesses sufficient performance to execute each of the restoration target applications and sufficient capacity for the access target volume of each of the restoration target applications, take at least obtaining an affirmative result in this determination as a second condition, and select, for each of the restoration target applications, a normal primary site which fulfills the second condition as the restoration site.

5. The storage system according to claim 4,
wherein the management computer is configured to determine, for each of the restoration target applications, whether, among the normal primary sites which fulfill the second condition, there exists a primary site which possesses sufficient data transfer bandwidth as remote copying data transfer bandwidth for remote-copying restoration copy data which exists at the secondary site, take at least obtaining an affirmative result in this determination as a third condition, and select, for each of the restoration target applications, a normal primary site which fulfills the third condition as the restoration site.

6. The storage system according to claim 5,
wherein the management computer is configured to divide the restoration copy data which exists at the secondary site into a plurality of restoration copy data in association with each of the restoration target applications, and remote-copy the divided restoration copy data, for each of the restoration target applications, to the storage apparatus of the primary site selected as the restoration site via the data network.

7. The storage system according to claim 1,
wherein the management computer is configured to select, from among the normal primary sites, a primary site which is a short network distance from the primary site subject to disaster as the restoration site.

8. A storage system, comprising:
a plurality of sites which comprise a storage apparatus comprising a plurality of storage devices, and a host computer which is configured to issue data I/O processing requests to the storage apparatus;
a data network which interconnects the storage apparatuses of each of the sites; and
a management computer which is configured to exchange information with the storage apparatuses and host computers of each of the sites via a management network and which is configured to manage a data processing performance and a data processing status of each of the sites,
wherein the management computer is configured to manage, among the plurality of sites, two or more sites other than a backup site as primary sites and the backup site as a secondary site respectively, remote-copy data which is stored in the storage apparatuses of each of the primary sites to the storage apparatus of the secondary site via the data network respectively, and manage the remote-copied data as copy data, and
wherein, when any of the primary sites is subject to disaster,
the management computer is configured to select, on the basis of the data processing performance and the data processing status of the sites other than the primary site subject to disaster, at least a normal primary site other than the primary site subject to disaster as a restoration site which possesses processing performance for restoring a restoration target application which is a data I/O processing application which was running on the primary site subject to disaster, and
remote-copy restoration copy data, which exists at the secondary site and which is data that was used by the restoration target application, to the storage apparatus of the primary site selected as the restoration site, via the data network,
wherein, if a plurality of application groups comprising a plurality of mutually integrated restoration target applications exist as groups which are configured from the restoration target applications, the management computer is configured to determine, for each of the application groups, whether, among the normal primary sites, a primary site exists which possesses a data transfer bandwidth for which the data transfer time required to copy each application group from the secondary site is within a recovery time objective, take at least obtaining an affirmative result in this determination as a first condition and select, for each of the application groups, a normal primary site which fulfills the first condition as the restoration site.

9. The storage system according to claim 8,
wherein the management computer is configured to determine, for each of the application groups, whether, among the normal primary sites which fulfill the first condition, there exists a primary site which possesses sufficient performance to execute each of the application groups and sufficient capacity for the access target volume of each of the application groups, take at least obtaining an affirmative result in this determination as a second condition, and select, for each of the application groups, a normal primary site which fulfills the second condition as the restoration site.

10. The storage system according to claim 9,
wherein the management computer is configured to determine, for each of the application groups, whether, among the normal primary sites which fulfill the second condition, there exists a primary site which possesses sufficient data transfer bandwidth as remote copying data transfer bandwidth for remote-copying restoration copy data which exists at the secondary site, take at least obtaining an affirmative result in this determination as a third condition, and select, for each of the application groups, a normal primary site which fulfills the third condition as the restoration site.

11. The storage system according to claim 10,
wherein the management computer is configured to divide the restoration copy data which exists at the secondary site into a plurality of restoration copy data in association with each of the application groups, and remote-copy the divided restoration copy data, for each of the application groups, to the storage apparatus of the primary site selected as the restoration site via the data network.

12. A data processing method of a storage system which comprises a plurality of sites which comprise a storage apparatus comprising a plurality of storage devices, and a host computer which is configured to issue data I/O processing requests to the storage apparatus;
a data network which interconnects the storage apparatuses of each of the sites; and
a management computer which is configured to exchange information with the storage apparatuses and host computers of each of the sites via a management network and which is configured to manage a data processing performance and a data processing status of each of the sites,
wherein the management computer executes:
a management step in which the management computer is configured to manage, among the plurality of sites, two or more sites other than a backup site as primary sites and the backup site as a secondary site respectively, remote copies data which is stored in the storage apparatuses of each of the primary sites to the storage apparatus of the secondary site via the data network respectively, and manage the remote-copied data as copy data;
a selection step, in which, when any of the primary sites is subject to disaster,
the management computer is configured to select, on the basis of the data processing performance and the data processing status of the sites other than the primary site subject to disaster, at least a normal primary site other than the primary site subject to disaster as a restoration site which possesses processing performance for restoring a restoration target application which is a data I/O processing application which was running on the primary site subject to disaster; and
a copy step, in which the management computer is configured to remote-copy restoration copy data, which exists at the secondary site and which is data that was used by the restoration target application, to the storage apparatus of the primary site selected as the restoration site, via the data network,
wherein, in the selection step, the management computer is configured to determine whether, among the normal primary sites, there exists a primary site with a data transfer bandwidth for which a data transfer time required to copy the restoration target application from the secondary site is within a recovery time objective, take at least obtaining an affirmative result in this determination as a first condition, and select a normal primary site which fulfills the first condition as the restoration site,
wherein in the selection step, the management computer is configured to determine whether, among the normal primary sites which fulfill the first condition, there exists a primary site which possesses sufficient performance to execute the restoration target application and sufficient capacity for the access target volume of the restoration target application, take at least obtaining an affirmative result in this determination as a second condition, and select a normal primary site which fulfills the second condition as the restoration site.

* * * * *